(12) United States Patent
Watanabe et al.

(10) Patent No.: US 6,737,847 B2
(45) Date of Patent: May 18, 2004

(54) CAPACITOR CHARGING METHOD AND CHARGING APPARATUS

(75) Inventors: Kiyomi Watanabe, Kashiwa (JP); Takayuki Mimura, Tokyo (JP); Teruo Tomaki, Saitama (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 10/262,749

(22) Filed: Oct. 2, 2002

(65) Prior Publication Data

US 2003/0080719 A1 May 1, 2003

(30) Foreign Application Priority Data

Oct. 30, 2001 (JP) .................................... P 2001-331782

(51) Int. Cl.[7] ................................................ G05F 1/40
(52) U.S. Cl. ...................... 323/288; 323/225; 320/166; 307/109
(58) Field of Search ................................. 323/222, 225, 323/282, 283, 284, 285, 288; 320/166, 167; 307/109, 110

(56) References Cited

U.S. PATENT DOCUMENTS

| 5,461,297 A | * | 10/1995 | Crawford ..................... 320/166 |
| 5,914,542 A | * | 6/1999 | Weimer et al. ............. 307/125 |
| 6,114,842 A | * | 9/2000 | Simpson et al. ............ 323/223 |
| 6,384,579 B2 | | 5/2002 | Watanabe .................... 320/166 |

FOREIGN PATENT DOCUMENTS

| JP | 08-107245 | 4/1996 |
| JP | 08-130870 | 5/1996 |
| JP | 09-275633 | 11/1997 |
| JP | 09-307165 | 11/1997 |
| JP | 09-312974 | 12/1997 |
| JP | 10-052039 | 2/1998 |
| JP | 10-117478 | 5/1998 |
| JP | 2002-010486 | 1/2002 |
| JP | 2002-064944 | 2/2002 |
| JP | 2002-118976 | 4/2002 |
| JP | 2002-198597 | 7/2002 |
| WO | WO 99/31773 | 6/1999 |

OTHER PUBLICATIONS

U.S. patent application Ser. No. 10/208,256, Muraki et al., filed Oct. 18, 2002.
Muraki, et al., "Capacitor Charger Using a Resonant Converter and its Digital Predictive Control", *The Institute of Electronics, Information and Communication Engineers* 23–29 (2001) (no month).
Muraki, et al., "A Study of the Digital Control System in the Quick Capacitor Charger for Excimer Laser", *Origin Technical Journal* 65:11–17 (2002) (no month).

* cited by examiner

*Primary Examiner*—Jessica Han
(74) *Attorney, Agent, or Firm*—Hoffmann & Baron, LLP

(57) ABSTRACT

An energy accumulating capacitor such as an excimer laser is prevented from being overcharged by stored energy in a resonance inductance device. In a resonant capacitor charging circuit, when it is forecast that an energy accumulating capacitor can be charged to a target charge voltage by the magnetic energy of a resonant inductance device after a first semiconductor switch is switched off, the first semiconductor switch is switched off, and when actually reaching the target charge voltage, a second semiconductor switch is switched on or off, in order to charge with high accuracy.

20 Claims, 13 Drawing Sheets

CAPACITOR CHARGING METHOD AND CHARGING APPARATUS

BACKGROUND OF THE INVENTION

1. Field of the Invention

The present invention relates to a resonant charging type capacitor charging apparatus in which an inductance device and an energy accumulating capacitor resonate to charge the energy accumulating capacitor. In particular, the invention relates to a capacitor charging method and charging apparatus that prevent with high accuracy, an energy accumulating capacitor from being overcharged by inertial current, which is caused by magnetic energy stored in an inductance device.

2. Description of the Related Art

In a pulse laser such as an excimer laser, the charge of a capacitor for accumulating energy, which has been charged to a high voltage of approximately several kV to several tens of kV, is discharged at high speed to a laser tube via a magnetic compressor or the like, thereby exciting laser light. In an apparatus using a pulse laser, the higher the number of laser light excitations, that is, the higher the number of repetitions of charging and discharging the energy accumulating capacitor, the greater its capability as a laser apparatus. Therefore in recent years there have been attempts to achieve a high repetition rate of several kHz.

Consequently, the charging apparatus of the energy accumulating capacitor must be capable of repeated high-speed charging operations to completely charge it in less than several hundred $\mu$s. Furthermore, excimer lasers require a highly accurate degree of voltage stability, detecting fluctuations in the output of laser light in each cycle and controlling the output of laser light in the subsequent cycle accordingly. Therefore, the charge voltage must be controlled in each cycle, making high-speed controllability an important feature.

FIG. 12 shows an example of a conventional resonant charging type capacitor charging apparatus. Reference numeral 1 represents a dc power supply obtained by rectifying ac power such as a commercial power supply. Reference numeral 4 represents a semiconductor switch such as an IGBT (Insulated Gate Bipolar Transistor) or the like, reference numeral 5 represents a resonant inductance device, reference numeral 7 represents a diode circuit, reference numeral 8 represents an energy accumulating capacitor, being a load, and these are connected to the dc power supply 1 equivalently, in series. Reference numerals 9 and 10 represent voltage detecting resistors. Reference numeral 3 represents a flywheel diode connected between the negative terminal of the dc power supply 1 and a node between the semiconductor switch 4 and the resonant inductance device 5. Reference numeral 14 represents a control circuit, which controls such that the semiconductor switch 4 is switched on by a charge start signal 16, and the semiconductor switch 4 is switched off when the voltage of the energy accumulating capacitor 8 reaches a target charge voltage VI supplied from a reference voltage power supply 15.

The operation will be described using FIG. 13. I represents the current flowing through the resonant inductance device 5, the white part is current flowing through the semiconductor switch 4, and the diagonally hatched part is current in which inertial current, occurring due to magnetic energy stored in the resonant inductance device 5, flows into the energy accumulating capacitor 8 through the flywheel diode 3 after the energy supply from the dc power supply 1 to the resonant inductance device 5 is stopped by switching off the semiconductor switch 4.

When the semiconductor switch 4 is switched on by the control circuit 14 on receiving the charge start signal 16 at time t0, resonant current flows due to the resonant inductance device 5 and the energy accumulating capacitor 8, and if no circuit loss occurs in components, wiring or the like by the flow of the charging current, the energy accumulating capacitor 8 is charged toward approximately twice the voltage value of the output voltage E of the dc power supply 1. When the charge voltage Vc, obtained by dividing the charge voltage of the energy accumulating capacitor 8 using the voltage detecting resistors 9 and 10, reaches the target charge voltage V1 at time t1, the control circuit 14 switches off the semiconductor switch 4. However, the flywheel diode 3 is switched on by inertial current due to the residual energy of the resonant inductance device 5, and continues charging the energy accumulating capacitor 8, which is overcharged by $\Delta V$.

Therefore, Japanese Unexamined Patent Application, First Publication No. Hei 8-9638 using a resonant charging scheme discloses a method in which power supply voltage is detected and added to a reference voltage out of phase, and the off timing of a semiconductor switch is adjusted such that variations of power supply voltage are compensated. However, the relationship between power supply voltage variation and excess charge amount is not linear, and in a real charger the final charge voltage always changes, so that it is not possible to improve the accuracy by only compensating for power supply voltage variation.

SUMMARY OF THE INVENTION

Accordingly, the present invention aims to provide a capacitor charging method and charging apparatus that can always charge an energy accumulating capacitor with highly accurate voltage stability, using a target charge voltage for the energy accumulating capacitor, and input voltage variation, even if the voltage of a dc power supply changes due to variations of a target charge voltage of the energy accumulating capacitor and an input voltage.

A capacitor charging method according to a first aspect of the present invention comprises the steps of: in a series connected circuit of a first semiconductor switch, a resonant inductance device, a diode circuit, and an energy accumulating capacitor, which are connected together in series to a dc power supply, starting charging of the energy accumulating capacitor due to the resonance of the resonant inductance device and the energy accumulating capacitor by switching on the first semiconductor switch; stopping energy supply from the dc power supply to the resonant inductance device by switching off the first semiconductor switch, when an equation $Vc=\alpha((V1^2-Vo^2)/(2E)+Vo)$ is satisfied, where V1 is a target charge voltage of the energy accumulating capacitor, Vc is a charge voltage of the energy accumulating capacitor, Vo is an initial voltage of the energy accumulating capacitor, E is an output voltage of the dc power supply, and a is a circuit loss coefficient for compensating for power loss occurring in components and wiring due to the flow of charging current; and after the first semiconductor switch is switched off, charging the energy accumulating capacitor to the target charge voltage V1 by the flow of inertial current caused by magnetic energy stored in the resonant inductance device, using a flywheel diode.

That is to say, charging is performed while calculating a forecast of the amount of added charge due to inertial current after the energy supply from the dc power supply to the resonant inductance device is stopped by the first semiconductor switch being switched off, and when it is determined by the calculation of the above equation that the energy accumulating capacitor can be charged to the target charge voltage by the inertial current, the first semiconductor switch is switched off, after which it is possible to charge to the target charge voltage with high accuracy using the inertial current.

A capacitor charging method according to a second aspect of the present invention comprises the steps of: in a series connected circuit of a first semiconductor switch, a resonant inductance device, a diode circuit, and an energy accumulating capacitor, which are connected together in series to a dc power supply, starting charging of the energy accumulating capacitor due to the resonance of the resonant inductance device and the energy accumulating capacitor by switching on the first semiconductor switch; stopping energy supply from the dc power supply to the resonant inductance device by switching off the first semiconductor switch, when an equation $LI^2 = \alpha C(V1^2 - Vc^2)$ is satisfied, where I is a current flowing through the resonance inductance device, C is a capacitance of the energy accumulating capacitor, L is an inductance value of the resonant inductance device, V1 is a target charge voltage of the energy accumulating capacitor, Vc is a charge voltage of the energy accumulating capacitor, and $\alpha$ is a circuit loss coefficient for compensating for power loss occurring in components and wiring due to the flow of charging current; and after the first semiconductor switch is switched off, charging the energy accumulating capacitor to the target charge voltage V1 by the flow of inertial current caused by magnetic energy stored in the resonant inductance device, using a flywheel diode.

That is to say, charging is performed while calculating a forecast of the amount of added charge due to inertial current after the energy supply from the dc power supply to the resonant inductance device is stopped by the first semiconductor switch being switched off, and when it is determined by the calculation of the above equation that the energy accumulating capacitor can be charged to the target charge voltage by the inertial current, the first semiconductor switch is switched off, after which it is possible to charge to charge to the target charge voltage with high accuracy using the inertial current.

The capacitor charging method according to the first or second aspect of the present invention may bypass the inertial current flowing into the energy accumulating capacitor by switching on a second semiconductor switch when the voltage of the energy accumulating capacitor reaches the target charge voltage V1 by means of the inertial current.

This is a capacitor charging method using a second semiconductor switch, which cuts off excess inertial current to the energy accumulating capacitor by bypassing it.

The capacitor charging method according to the first or second aspect of the present invention may switch on or off a second semiconductor switch that cuts off the inertial current flowing into the energy accumulating capacitor and may feed back the inertial current to the dc power supply when the voltage of the energy accumulating capacitor reaches the target charge voltage V1 by means of the inertial current.

This is a capacitor charging method using a second semiconductor switch, wherein inertial current to the energy accumulating capacitor is cut off, and this inertial current is fed back to the dc power supply.

A capacitor charging apparatus according to a first aspect of the present invention comprises: a first semiconductor switch, a resonant inductance device, a diode circuit, and an energy accumulating capacitor, which are connected together in series to a dc power supply; a first detecting device which detects an output voltage E of the dc power supply; a second detecting device which detects a charge voltage Vc of the energy accumulating capacitor; a computation section which outputs a signal for switching off the first semiconductor switch when an equation $Vc = \alpha((V1^2 - Vo^2)/(2E) + Vo)$ is satisfied, using values detected by the first detecting device and the second detecting device, where V1 is a target charge voltage of the energy accumulating capacitor, Vo is an initial voltage of the energy accumulating capacitor, and $\alpha$ is a circuit loss coefficient for compensating for power loss occurring in components and wiring due to the flow of charging current; a first control section which charges the energy accumulating capacitor due to the resonance of the resonant inductance device and the energy accumulating capacitor by switching on the first semiconductor switch, and stops energy supply from the dc power supply to the resonant inductance device by switching off the first semiconductor switch, according to the signal from the computation section; and a flywheel diode which charges the energy accumulating capacitor to the target charge voltage V1 by means of the flow of inertial current caused by magnetic energy stored in the resonant inductance device after the first semiconductor switch is switched off.

This is a capacitor charging apparatus using the first aspect of a capacitor charging method.

A capacitor charging apparatus according to a second aspect of the present invention comprises: a first semiconductor switch, a resonant inductance device, a diode circuit, and an energy accumulating capacitor, which are connected in series to an dc power supply; a current detecting device which detects a current I flowing through the resonant inductance device; a voltage detecting device which detects a charge voltage Vc of the energy accumulating capacitor; a computation section which outputs a signal for switching off the first semiconductor switch when an equation $LI^2 = \alpha C(V1^2 - Vc^2)$ is satisfied, using values detected by the current detecting device and the voltage detecting device, where C is a capacitance of the energy accumulating capacitor, L is an inductance value of the resonant inductance device, V1 is a target charge voltage of the energy accumulating capacitor, and $\alpha$ is a circuit loss coefficient for compensating for power loss occurring in components and wiring due to the flow of charging current; a first control section which charges the energy accumulating capacitor due to the resonance of the resonant inductance device and the energy accumulating capacitor by switching on the first semiconductor switch, and stops energy supply from the dc power supply to the resonant inductance device by switching off the first semiconductor switch, according to the signal from the computation section; and a flywheel diode which charges the energy accumulating capacitor to the target charge voltage V1 by means of the flow of inertial current caused by magnetic energy stored in the resonant inductance device after the first semiconductor switch is switched off.

This is a capacitor charging apparatus using the second aspect of a capacitor charging method.

The capacitor charging apparatus according to the first or second aspect of the present invention may further comprise: a second semiconductor switch which bypasses the inertial current to the energy accumulating capacitor; and a second control section which switches on the second semiconductor switch when the charge voltage of the energy accumulating capacitor reaches the target charge voltage V1 by means of the inertial current, using values detected by the first detecting device and the second detecting device, or the current detecting device and the voltage detecting device.

This is a capacitor charging apparatus using a capacitor charging method, wherein excess inertial current flow into the energy accumulating capacitor is cut off by being bypassed.

In the capacitor charging apparatus according to the first or second aspect of the present invention, the second semiconductor switch may be connected in parallel to both terminals of the energy accumulating capacitor, and the diode circuit may be connected between the second semiconductor switch and the energy accumulating capacitor.

Here, a step-up transformer may be further provided in between the resonant inductance device and the second semiconductor switch, and the resonant inductance device may include leakage inductance of the transformer.

In the capacitor charging apparatus according to the first or second aspect of the present invention, the first semiconductor switch may be a bridge inverter circuit, which is provided with four semiconductor switches in two pairs, and flywheel diodes connected in reverse parallel to these semiconductor switches respectively.

In a capacitor charging apparatus of the first aspect or second aspect of the present invention, the diode circuit may be a full bridge circuit, a half bridge circuit or a diode.

The capacitor charging apparatus according to the first or second aspect of the present invention may further comprise: a second semiconductor switch which cuts off the inertial current to the energy accumulating capacitor; and a second control section which switches on or off the second semiconductor switch when the charge voltage of the energy accumulating capacitor reaches the target charge voltage V1 by means of the inertial current, using values detected by the first detecting device and the second detecting device, or the current detecting device and the voltage detecting device, and feeds back the inertial current to the dc power supply.

This is a capacitor charging method using a second semiconductor switch that cuts off inertial current to an energy accumulating capacitor.

Here, one end of the second semiconductor switch may be connected to a node between the resonant inductance device and a diode for preventing reverse flow, via the diode for preventing reverse flow, and the other end may be connected to the dc power supply.

In addition, one end of the second semiconductor switch may be connected to a node between the resonant inductance device and the diode circuit via a diode for preventing reverse flow, and the other end may be connected to the dc power supply.

As described above, in the present invention, charging is performed while calculating a forecast of the amount of added charge due to inertial current after the energy supply from the dc power supply to the resonant inductance device is stopped by the semiconductor switch being switched off, and when it is determined that the energy accumulating capacitor can be charged to the target charge voltage by the inertial current, the first semiconductor switch is switched off, and afterwards the inertial current charges it to the target charge voltage.

Furthermore, a second semiconductor switch for bypass or cutoff is provided, separate to the first semiconductor switch which starts charging the energy accumulating capacitor, being a load. The energy accumulating capacitor is charged by the resonance of the resonant inductance device and the energy accumulating capacitor when the first semiconductor switch is switched on, and before it is charged to the target charge voltage, the first semiconductor switch is switched off. Afterwards, when the energy accumulating capacitor reaches the target charge voltage, in a first method the second semiconductor switch is switched on, excess charging current to the energy accumulating capacitor is cut off by being bypassed, and overcharging is prevented, giving a highly accurate charge. Moreover, in a second method, the second semiconductor switch is switched on or off, excess charging current to the energy accumulating capacitor is cut off, and overcharging is prevented, giving a highly accurate charge.

In this manner, in the present invention, the first semiconductor switch and the second semiconductor switch are controlled by two control circuits, and thus charging is controlled while calculating a forecast of the amount of overcharging of an energy accumulating capacitor caused by inertial current from the resonant inductance device of a capacitor charging circuit, and when the energy accumulating capacitor is charged to a target charge voltage by the inertial current, by switching the second semiconductor switch on or off, it is possible to achieve an extremely highly accurate degree of stability of charge voltage of an energy accumulating capacitor such as an excimer laser source and the like.

DETAILED DESCRIPTION OF THE PREFERRED EMBODIMENTS

As follows is a description of an embodiment of the present invention with reference to drawings.

[Embodiment 1]

Figure 1:
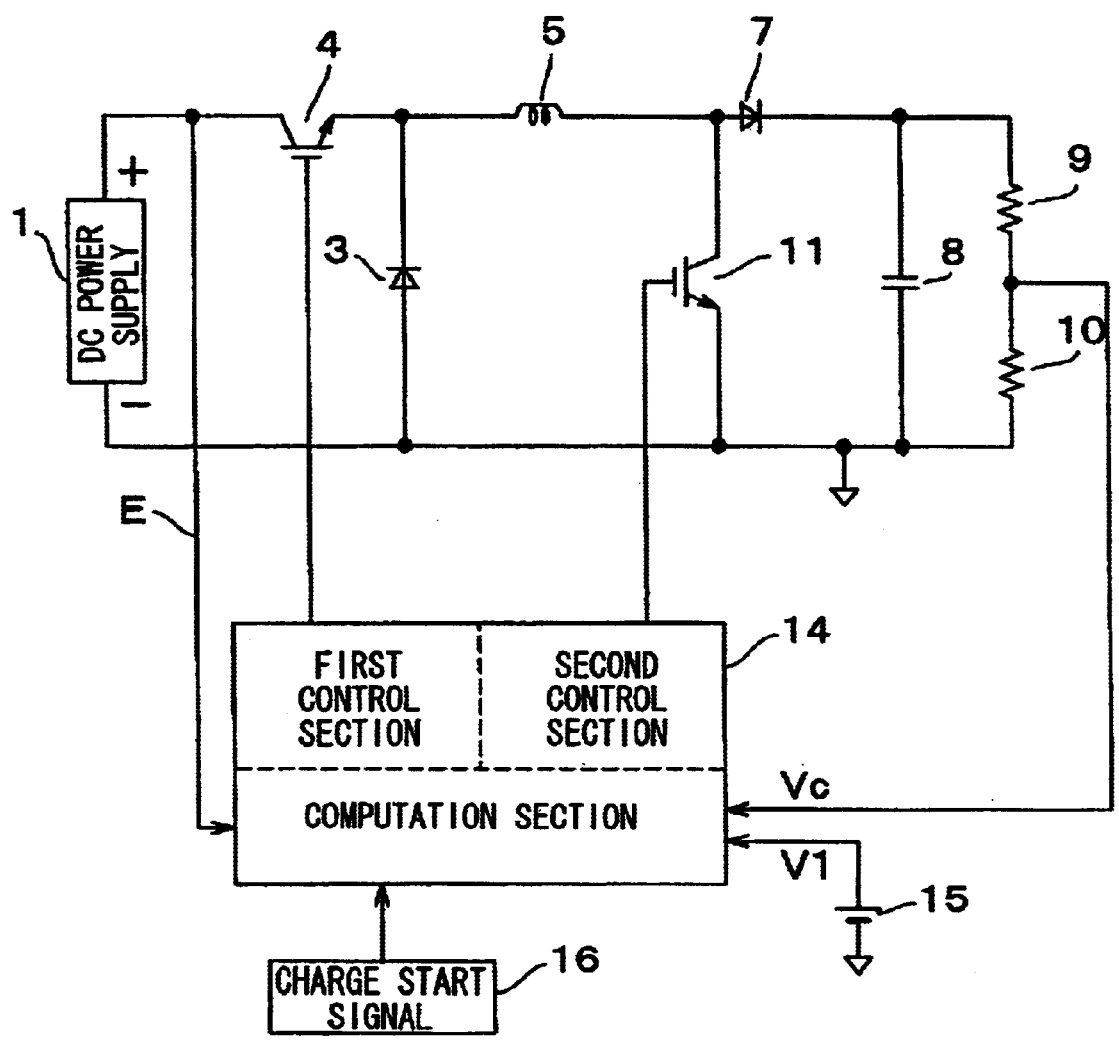
FIG. 1 is a circuit diagram showing the constitution of a capacitor charging apparatus according to a first embodiment of the present invention.
Figure 12:
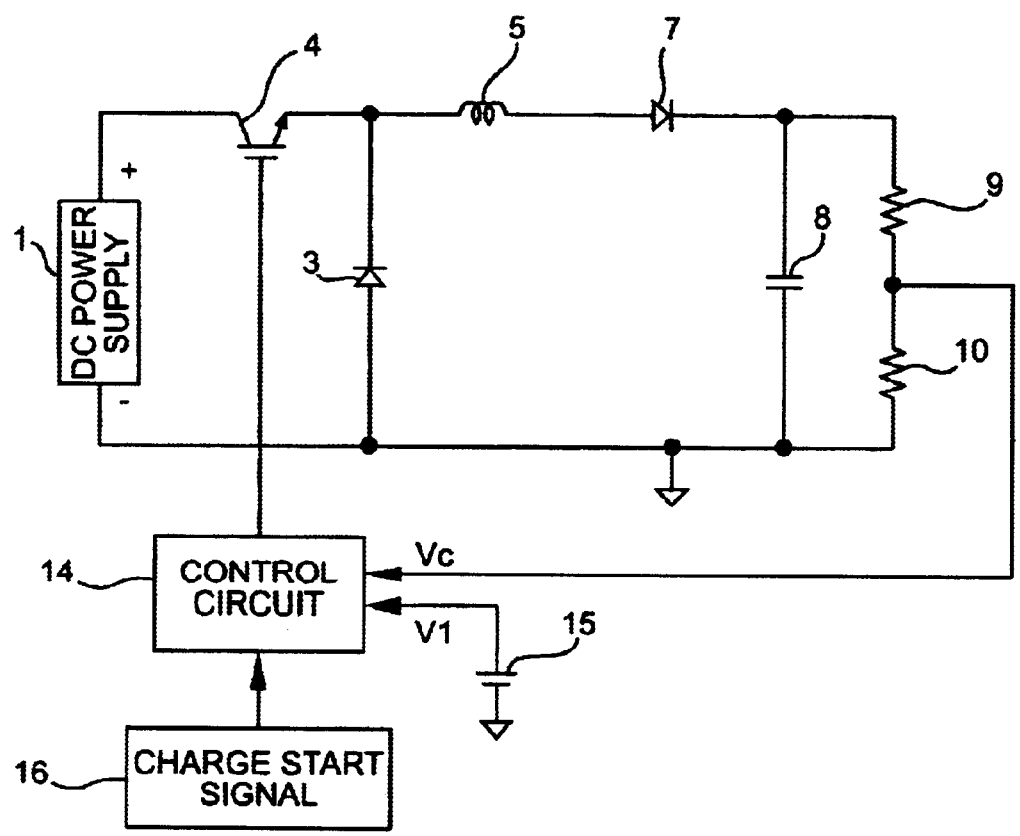
FIG. 12 is a circuit diagram showing one example of a conventional capacitor charging apparatus.
Figure 13:
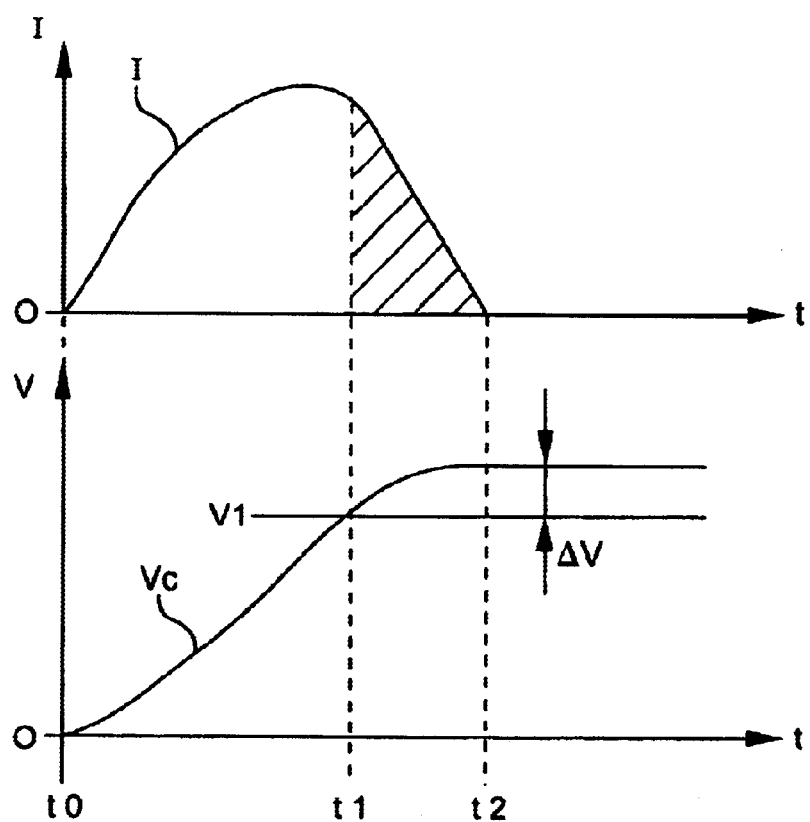
FIG. 13 is a diagram showing current and voltage waveforms to explain the operation in FIG. 12.

Firstly, a resonant charging type capacitor charging apparatus of a first embodiment of the present invention will be described with reference to FIG. 1. A difference from the conventional example shown in FIG. 12 is that, in the main circuit (that is, the parts other than the control circuit), there is provided a second semiconductor switch 11 connected across a series circuit of a diode circuit 7 and an energy accumulating capacitor 8, being a load. A control circuit 14 comprises a first control section that controls a first semiconductor switch 4, a second control section that controls the second semiconductor switch 11, and a computation section.

Required detection values such as the output voltage E of a dc power supply 1, a charge voltage Vc of the energy accumulating capacitor 8, a target charge voltage V1, and the like, are input to the control circuit 14 as parameters. Here, in a real circuit, the detected charge voltage Vc is divided by voltage detecting resistors 9 and 10. However, here it is designated a charge voltage Vc in order to simplify the description. A voltage V1, which is output from a reference voltage power supply 15, corresponds to the target charge voltage V1.

The first control section switches on the first semiconductor switch 4 by a charge start signal 16, and controls the off timing of the first semiconductor switch 4 according to predetermined computation results (detail is described later) calculated by the computation section. The second control section switches off the second semiconductor switch 11 by the charge start signal 16, and switches on the second semiconductor switch 11 when the charge voltage Vc reaches the target charge voltage V1.

Figure 2:
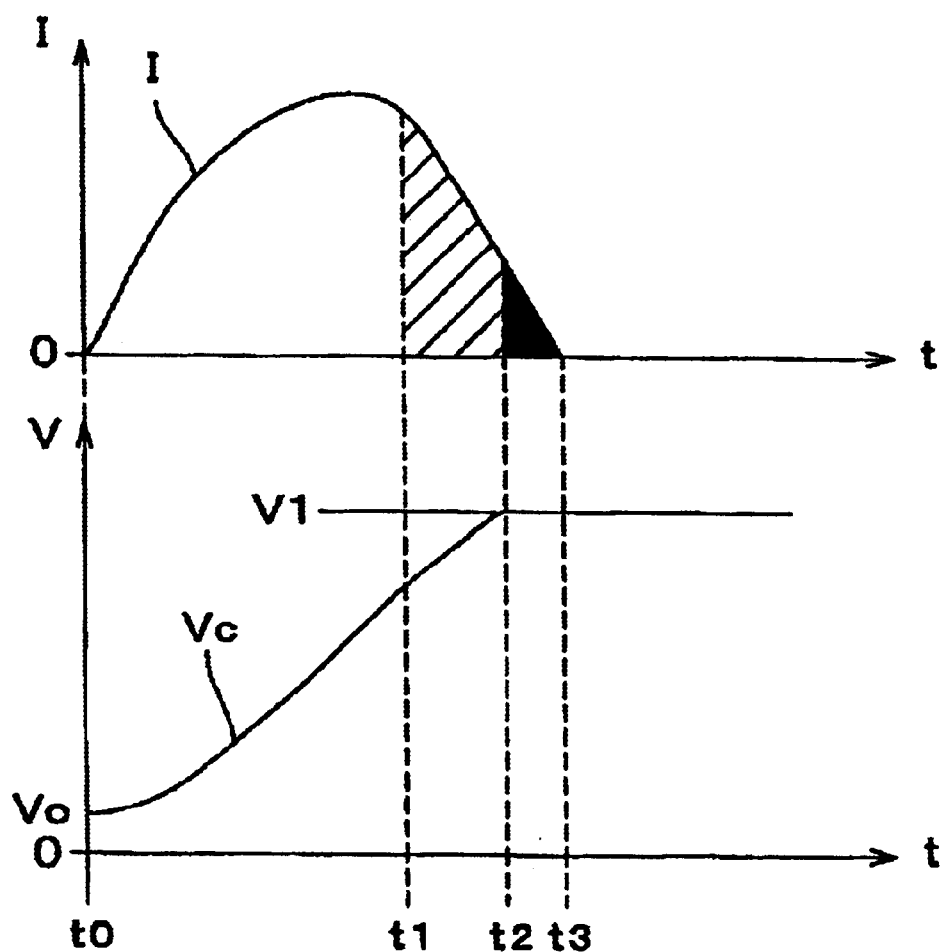
FIG. 2 is a diagram showing current and voltage waveforms to explain the operation of the capacitor charging apparatus according to the first embodiment.
Figure 5:
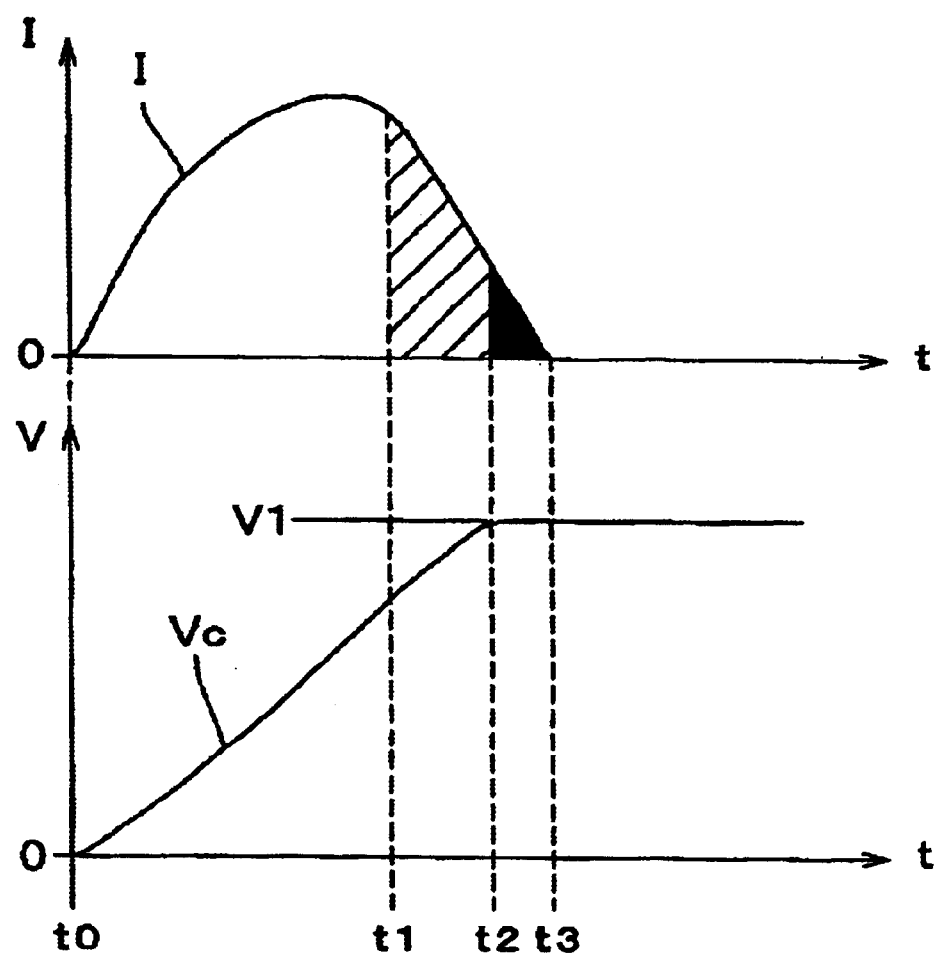
FIG. 5 is a reference drawing to explain the operation of the second embodiment.

The current and voltage waveforms are ideally as shown in FIG. 5. However, in practice, since the energy accumulating capacitor 8 has an initial voltage Vo, the current and voltage waveforms are as shown in FIG. 2. Therefore, hereunder the operation will be described by FIG. 2. The full waveform of current I represents the current flowing through a resonant inductance device 5, the white part is the current flowing through the first semiconductor switch 4, the diagonally hatched part is the current flowing into the energy accumulating capacitor 8 through a flywheel diode 3, and the black part is bypass current flowing into the flywheel diode 3 through the second semiconductor switch 11, which is mentioned later.

The first control section switches on the first semiconductor switch 4 at a time t0, triggered by the charge start signal 16, to start charging. The on time of the first semiconductor switch 4 is determined by; input variables such as the output voltage E of the dc power supply 1, and the charge voltage Vc, the initial voltage Vo, the target charge voltage V1, the inductance value L of the resonant inductance device 5, and a circuit loss coefficient a for compensating for power loss occurring in components, wiring or the like due to the flow of charging current, and when an equation $Vc=\alpha((V1^2-Vo^2)/(2E)+Vo)$ is satisfied, the first semiconductor switch 4 is switched off. The time at this time is a time t1.

After the first semiconductor switch is switched off, the flywheel diode 3 is switched on by the residual energy of the resonant inductance device 5, inertial current flows into the energy accumulating capacitor 8, and charging continues.

The second control section switches on the second semiconductor switch 11 at a time t2 when the charge voltage Vc reaches the target charge voltage V1. As a result, excess inertial current is bypassed through the second semiconductor switch 11, preventing the energy accumulating capacitor 8, being the load, from being overcharged, so that it is possible to charge the energy accumulating capacitor 8 with extremely high accuracy.

Here, the excess inertial current (the black part of the current waveform I in FIG. 2) that is bypassed circulates through the resonant inductance device 5, the second semiconductor switch 11 and the flywheel diode 3, and is finally consumed by circuit losses. In the case where the charge repetition frequency is high, it is necessary to consume it at a high speed, and hence it is desirable to connect a resistor with a low resistance value in series with the second semiconductor switch 11.

In this manner, in the present embodiment, computation is always performed in the computation section according to required parameters such as the output voltage E of the dc power supply 1, the target charge voltage V1, the charge voltage Vc, and the like. When the above-described equation is satisfied, the first semiconductor switch 4 is switched off when the charge voltage is lower than the target charge voltage V1, and afterwards, charging continues by inertial current, and when the charge voltage reaches the target charge voltage V1, the second semiconductor switch 11 is switched on to bypass the excess inertial current. Thus the energy accumulating capacitor 8 is not overcharged.

Here a description is given of the above equation.

In the case where the residual energy of the resonant inductance device 5 can charge the energy accumulating capacitor 8 to the target charge voltage V1 after the energy supply from the dc power supply 1 to the resonant inductance device 5 is stopped by switching off the first semiconductor switch 4, the charge voltage when the first semiconductor switch 4 is switched off is designated Vc.

It is assumed that the energy accumulating capacitor 8 can be charged to the target charge voltage V1 using the residual energy of the resonant inductance device 5 when the first semiconductor switch 4 is switched off at time t1, after it is on from times t0 to t1 during which the charge voltage is Vc. Furthermore, that the output voltage E of the dc power supply 1 is constant.

Next, consider that an input energy Je from the dc power supply 1, from when the first semiconductor switch 4 is switched on to when it is switched off, is equal to a charging energy Jc that charges the energy accumulating capacitor 8 from the initial voltage Vo to the target charge voltage V1.

Firstly, the input energy Je from the dc power supply 1 from time t0 to t1 is $Je=E\times\int i\, dt$ where the integral period is time t0 to t1.

On the other hand, since the energy accumulating capacitor 8 is charged from the initial voltage Vo to the charge voltage Vc by the current integral $\int i\, dt$ from time t0 to t1, then $C(Vc-Vo)=\int i\, dt$ is satisfied. Accordingly, $Je=E\times\int i\, dt=E\times C(Vc-Vo)$.

Here, the total charging energy Jc that charges the energy accumulating capacitor 8 from the initial voltage Vo to the target charge voltage V1 is $Jc=C(V1^2-Vo^2)/2$. Furthermore, since Je=Jc, then $E\times C(Vc-Vo)=C(V1^2-Vo^2)/2$. Rearranging this equation gives $Vc=(V1^2-Vo^2)/(2E)+Vo$.

That is, if the first semiconductor switch 4 is switched off when this equation is satisfied by detecting the output voltage E of the dc power supply 1, the initial voltage V0 and the charge voltage Vc, it is possible to charge the energy accumulating capacitor 8 to the target charge voltage V1 using the stored energy in the resonant inductance device 5.

Figure 3:
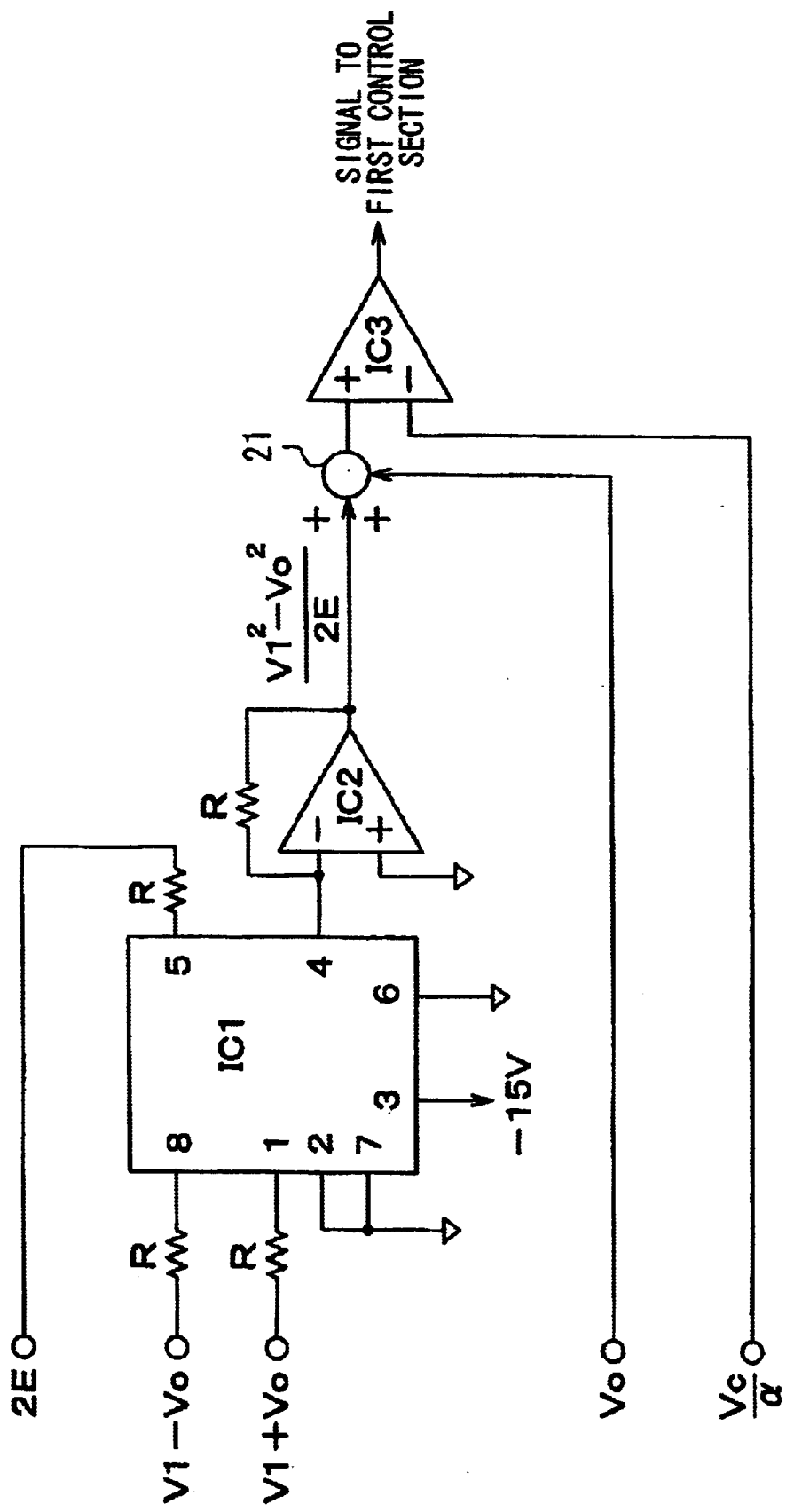
FIG. 3 is a circuit diagram showing a control example of the capacitor charging apparatus according to the first embodiment.

As shown in FIG. 3, a high-speed multiplier-divider integrated circuit IC 1 such as, for example, NJM 4200 from New Japan Radio Co. Ltd., an operational amplifier IC 2 for current to voltage conversion, and a comparator IC 3 are used, and the inputs V1+Vo and V1−Vo, which are added and subtracted by an operational amplifier or the like, and 2×E which is obtained by multiplication, are applied to three inputs of IC 1 to calculate the above-described equation. Furthermore, a circuit loss coefficient a is taken into consideration to compensate for power loss occurring in components, wiring or the like by the flow of charging current.

This IC 1 calculates $(V1-Vo)\times(V1+Vo)/(2E)$. That is, $(V1^2-Vo^2)/(2E)$ is calculated, and further Vo is added to this value in an adding circuit 21, and $(V1^2-Vo^2)/(2E)+Vo$ is calculated. This calculated result and $Vc/\alpha$, which is calculated separately, are compared in the IC 3, and when $(V1^2-Vo^2)/(2E)+Vo=Vc/\alpha$, that is, when $Vc=\alpha((V1^2-Vo^2)/(2E)+Vo)$, a signal is transmitted from the IC 3 to the first control section, and the first semiconductor switch 4 is switched off.

When the first semiconductor switch 4 is instructed to switch off at this time, in practice there is a control delay time, charging the energy accumulating capacitor 8 to more than the target charge voltage V1. Therefore, when the energy accumulating capacitor 8 reaches the target charge voltage V1 by inertial current charging after the first semiconductor switch 4 is switched off, the second semiconductor switch 11 is switched on to bypass the excess inertial current.

Here, there is a control delay time in the second semiconductor switch 11. However, the second semiconductor switch 11 is switched on when the inertial current is low because of the first semiconductor switch 4 being switched off due to the above-described calculation, and thus the amount that the energy accumulating capacitor 8 is overcharged can be greatly reduced, enabling extremely highly accurate charging.

[Embodiment 2]

Figure 4:
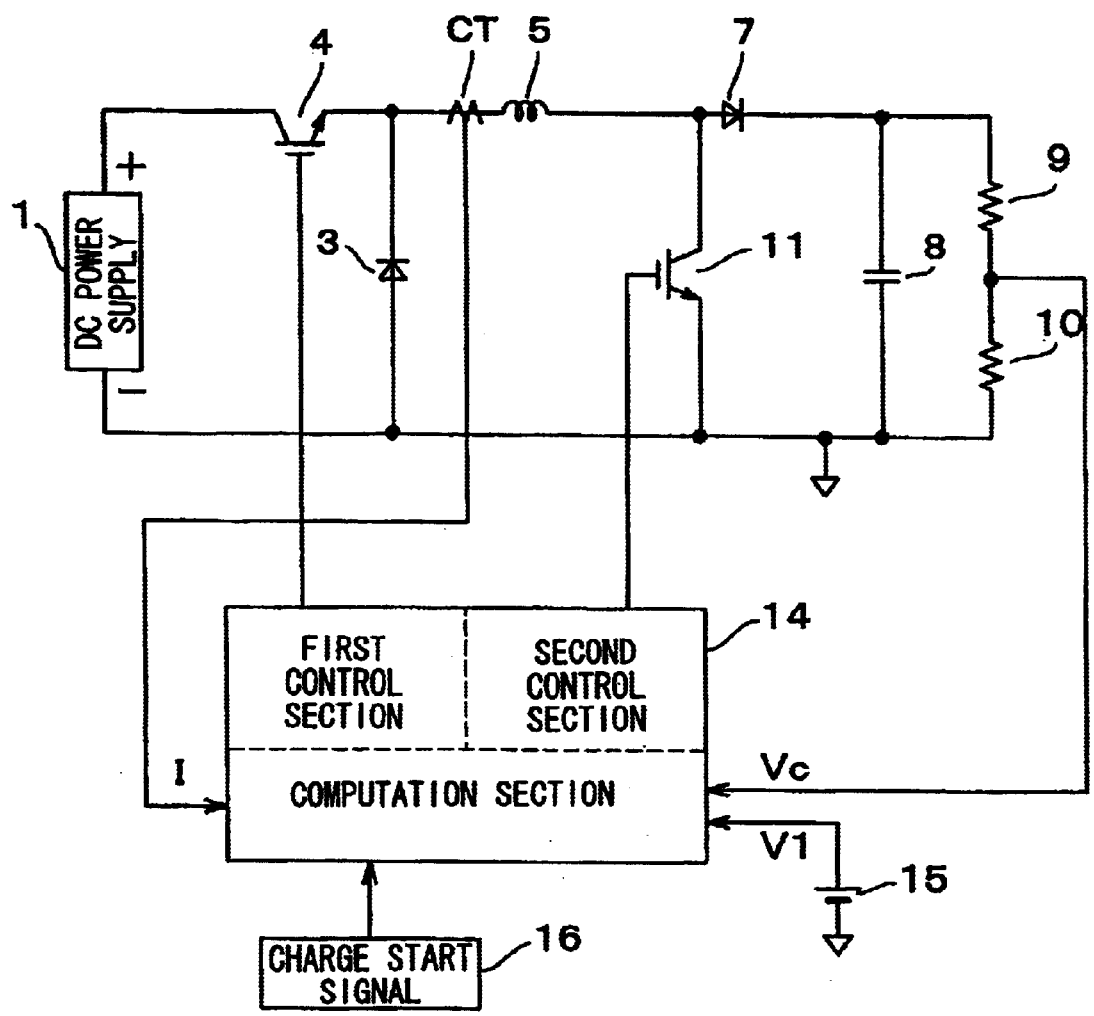
FIG. 4 is a circuit diagram showing the constitution of a capacitor charging apparatus according to a second embodiment of the present invention.

Next is a description of a second embodiment of a resonant charging type capacitor charging apparatus of the present invention with reference to FIG. 2 and FIG. 4. A resonant charging circuit and a circuit containing a second semiconductor switch 111 are the same as in the first embodiment. However, there is no circuit for detecting an output voltage E of a dc power supply 1, and instead there is a current detecting circuit using a current transformer CT for detecting a current I flowing into a resonant inductance device 5. A control circuit 14 comprises a first control section for controlling a first semiconductor switch 4, a second control section for controlling a second semiconductor switch 11, and a computation section, similarly to the first embodiment.

Required detection values such as the current I flowing through the resonant inductance device 5, a charge voltage Vc of the energy accumulating capacitor 8, a target charge voltage V1, and the like, are input to the control circuit 14 as parameters. The operation of the resonant charging circuit and the operation of the control circuit are the same as in the first embodiment, and hence the descriptions are omitted.

The first control section switches on the first semiconductor switch 4 at a time t0, triggered by the charge start signal 16, to start charging. The on time of the first semiconductor switch 4 is determined by; input variables such as the current I flowing through the resonant inductance device 5, and the charge voltage Vc, the capacitance C of the energy accumulating capacitor 8, the target charge voltage V1, the inductance value L of the resonant inductance device 5, and a circuit loss coefficient a for compensating for power loss occurring in components, wiring and the like due to the flow of charging current, and when an equation $LI^2=\alpha C(V1^2-Vc^2)$ is satisfied, the first semiconductor switch 4 is switched off. The time at this time is a time t1.

After the first semiconductor switch is switched off, the flywheel diode 3 is switched on by the residual energy of the resonant inductance device 5, inertial current flows into the energy accumulating capacitor 8, and charging continues.

The second control section switches on the second semiconductor switch 11 at a time t2 when the charge voltage Vc reaches the target charge voltage V1. As a result, excess inertial current is bypassed through the second semiconductor switch 11, preventing the energy accumulating capacitor 8 from being overcharged, so that it is possible to charge the energy accumulating capacitor 8 with extremely high accuracy.

Here, the excess inertial current (the black part of the current waveform I in FIG. 2) that is bypassed circulates through the resonant inductance device 5, the second semiconductor switch 11 and the flywheel diode 3, and is finally consumed by circuit losses. In the case where the charge repetition frequency is high, it is necessary to consume it at a high speed, and hence it is desirable to connect a resistor with a low value in series with the second semiconductor switch 11.

In this manner, in the present embodiment, computation is always performed in the computation section according to required parameters such as the target charge voltage V1, the current I flowing through the resonant inductance device 5, the charge voltage Vc, and the like. When the above-described equation is satisfied, the first semiconductor switch 4 is switched off when the charge voltage is lower than the target charge voltage V1, and afterwards charging continues by inertial current, and when the charge voltage reaches the target charge voltage V1, the second semiconductor switch 11 is switched on to bypass the excess inertial current. Thus the energy accumulating capacitor 8 is not overcharged.

Here a description is given of the above equation. In the case of charging to the target charge voltage V1 by the residual energy of the resonant inductance device 5 after the first semiconductor switch 4 is switched off at time t1, the charge voltage is designated Vc. If the current flowing through the resonant inductance device 5 is I, stored energy Ji of the resonant inductance device 5 at the time the first semiconductor switch 4 is switched off at Vc is $Ji=LI^2/2$.

Furthermore, after the first semiconductor switch 4 is switched off, the energy increase $\Delta J_C$ that is necessary for the energy accumulating capacitor 8 to be charged from Vc to the target charge voltage V1 is $\Delta J_C=C(V1^2-Vc^2)/2$.

Here, since all of the residual energy Ji of the resonant inductance device 5 immediately before the first semiconductor switch 4 is switched off is transferred to the energy accumulating capacitor 8, then $Ji=\Delta J_C$, and $LI^2/2=C(V1^2-Vc^2)/2$.

Moreover, considering a correction coefficient a for compensating for power loss occurring in components, wiring or the like due to the flow of charging current, then $LI^2=\alpha C(V1^2-Vc^2)$.

That is, if the first semiconductor switch 4 is switched off when this equation is satisfied by detecting the current I flowing through the resonant inductance device 5 and the charge voltage Vc, it is possible to charge the energy accumulating capacitor 8 to the target charge voltage V1 using the stored energy in the resonant inductance device 5.

Figure 6:
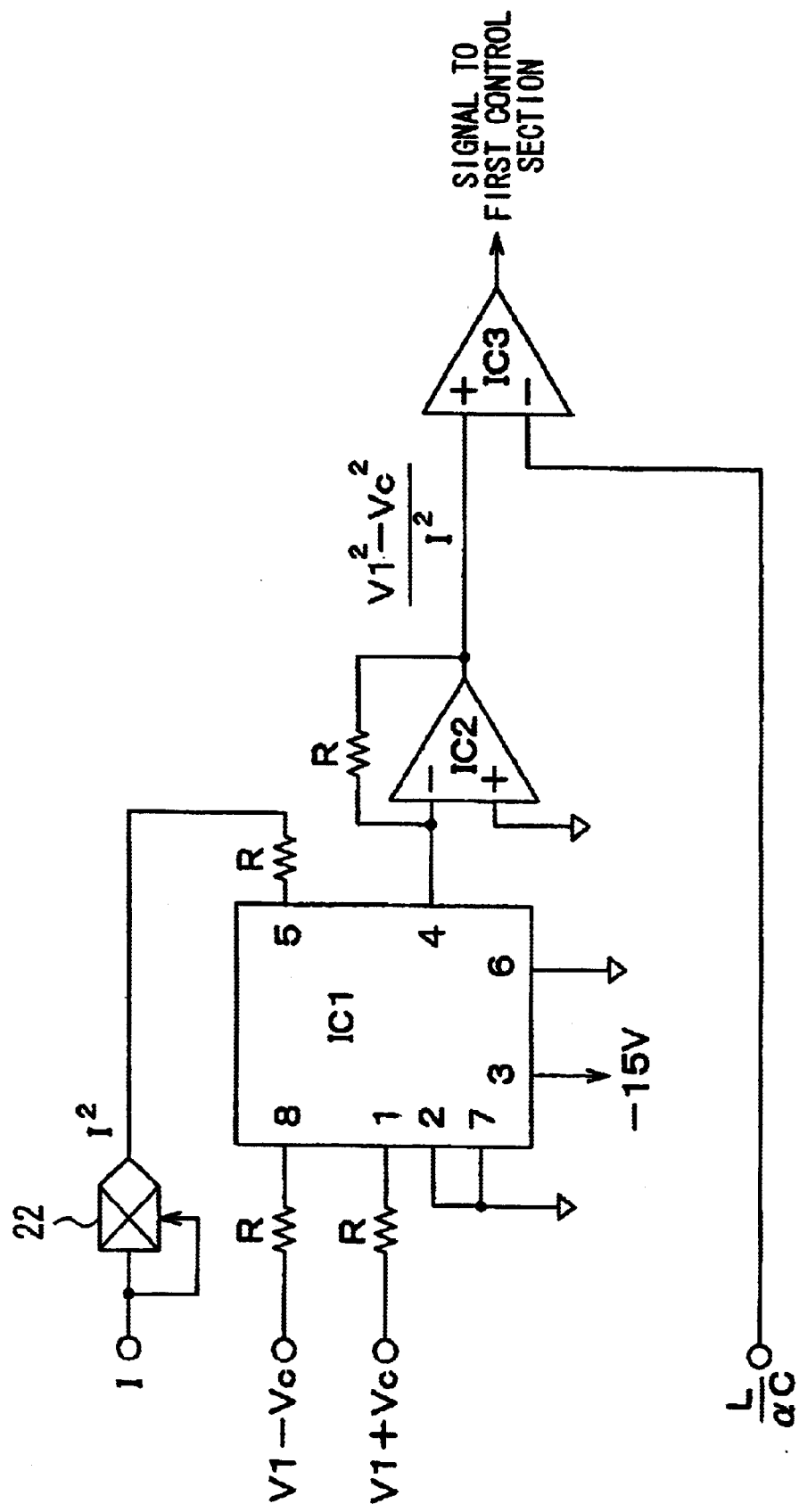
FIG. 6 is a circuit diagram showing a control example of the capacitor charging apparatus according to the second embodiment.

As shown in FIG. 6, a high-speed multiplier-divider integrated circuit IC 1 such as, for example, NJM 4200 from New Japan Radio Co. Ltd., is used, and the inputs V1+Vc and V1−Vc, which are added and subtracted by an operational amplifier or the like, and $I^2$ which is obtained by a multiplier 22, are applied to three inputs of IC 1 to calculate the above-described equation. This IC 1 calculates $(V1-Vc)\times(V1+Vc)/I^2$. That is, $(V1^2-Vc^2)/I^2$ is calculated, and this calculated result and $L/(\alpha C)$ which is calculated separately, are compared in the IC 3, and when $L/(\alpha C)=(V1^2-Vc^2)/I^2$, that is, when $LI^2=\alpha C(V1^2-Vc^2)$, the IC 3 transmits a signal to the first control section to turn off the first semiconductor switch 4.

When the first semiconductor switch 4 is instructed to switch off, in practice there is a control delay time, charging the energy accumulating capacitor 8 to more than the target charge voltage V1. Therefore, when the energy accumulating capacitor 8 reaches the target charge voltage V1 by inertial current charging after it is switched off, the second semiconductor switch 11 is switched on to bypass the excess inertial current.

Here, there is a control delay time in the second semiconductor switch 11. However, the second semiconductor switch 11 is switched on when the inertial current is low because of the first semiconductor switch 4 being switched off due to the above-described calculation, and thus the amount that the energy accumulating capacitor 8 is overcharged can be greatly reduced, enabling extremely highly accurate charging.

[Embodiment 3]

Figure 7:
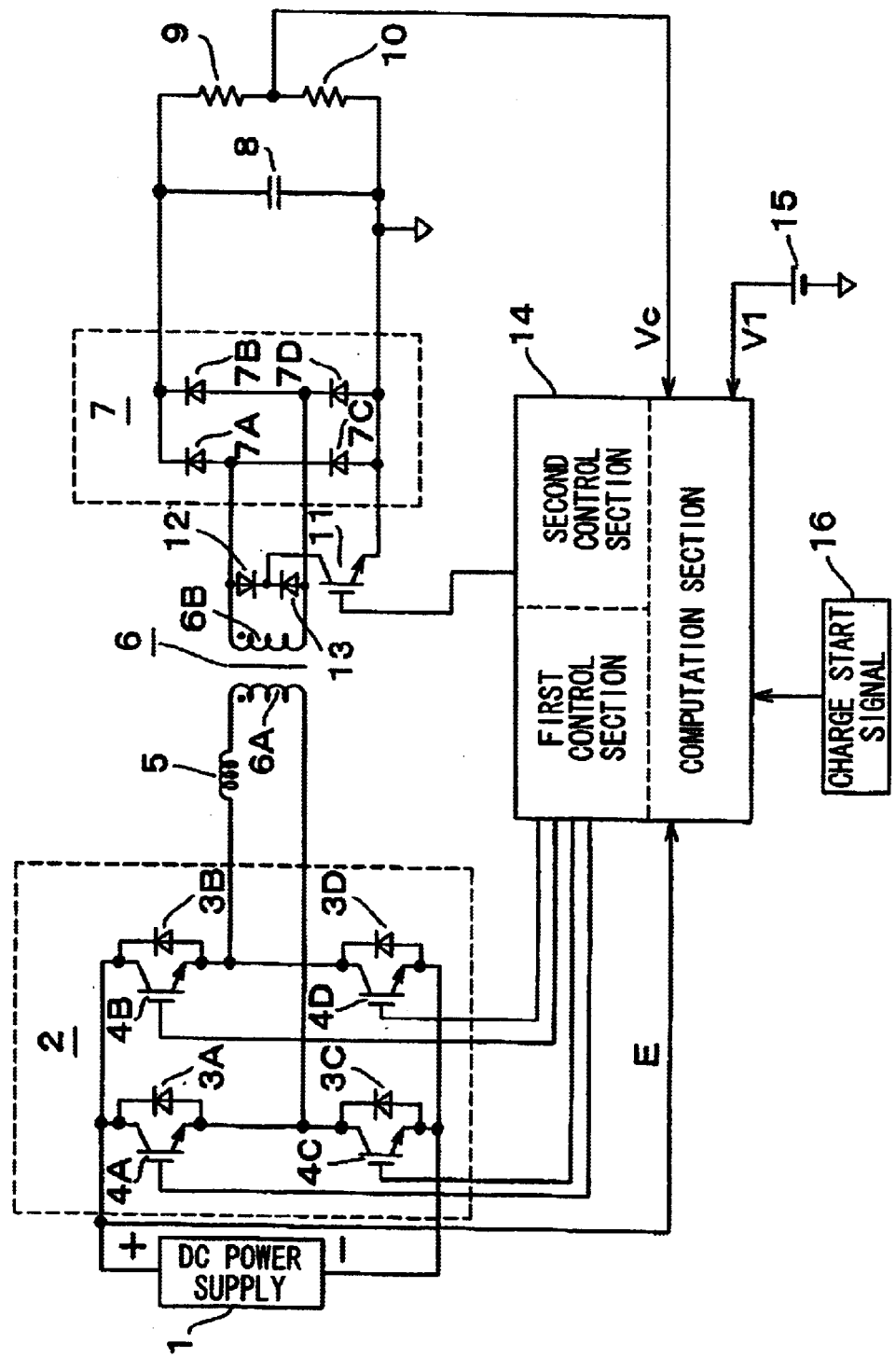
FIG. 7 is a circuit diagram showing the constitution of a capacitor charging apparatus according to a third embodiment of the present invention.

Next is a description of a third embodiment of a resonant charging type capacitor charging apparatus of the present invention referring to FIG. 7. This embodiment is an application of the principle in the first embodiment, but instead of the first semiconductor switch 4 and the flywheel diode 3, a bridge inverter circuit 2 is used, a transformer 6 is added, and the diode circuit 7 is a full-wave bridge rectifier.

Reference numeral 1 represents a typical dc power supply, which is a combination of a three phase full-wave rectifier that rectifies a commercial three phase alternating voltage, and a large capacitance electrolytic capacitor. The output from the dc power supply 1 is supplied to the inverter circuit 2. The inverter circuit 2, being a first semiconductor switch, comprises flywheel diodes 3A, 3B, 3C and 3D, and four IGBTs 4A, 4B, 4C and 4D, to which the flywheel diodes are connected in reverse parallel. The ac side output of the inverter circuit 2 is connected to a primary winding 6A of the transformer 6 via the resonant inductance device 5, boosted to a predetermined value at a secondary winding 6B, and supplied to the energy accumulating capacitor 8 through a diode circuit 7.

The black dots marked on the primary winding 6A and the secondary winding 6B indicate the polarities of the windings. The diode circuit 7 is a full-wave bridge rectifier comprising four diode circuits 7A, 7B, 7C and 7D. The resonant inductance device 5 also includes the leakage inductance of the transformer 6.

The resonant inductance device 5, the diode circuit 7 (full-wave bridge rectifier) and the energy accumulating capacitor 8 constitute a series resonant circuit. Here, when the inductance required for series resonance can be obtained by using only the leakage inductance of the transformer 6, the transformer 6 alone is sufficient, omitting the resonant inductance device 5.

When the pairs of IGBTs (reference symbols 4A and 4D, or 4B and 4C) in the inverter circuit 2 are switched alternately, the energy accumulating capacitor 8 is charged by resonance twice per cycle to a voltage that is approximately twice the value obtained by multiplying the voltage of the dc power supply 1 by the transformer ratio of the transformer 6. Reference numerals 9 and 10 represent voltage detecting resistors for detecting the charge voltage of the energy accumulating capacitor 8, which convert the charge voltage Vc of the energy accumulating capacitor 8 to a detecting voltage of several volts.

Reference numeral 11 represents a second semiconductor switch such as an IGBT, connected to both terminals of the secondary winding 6B through OR diode circuits 12 and 13 (reverse flow prevention diode circuit), and is also connected to the ground terminal of the diode circuit 7 (rectifier). Reference numeral 15 represents a reference voltage power supply for setting the charge voltage, and has a reference voltage corresponding to the target charge voltage V1.

A control circuit 14 comprises a first control section for controlling the inverter circuit 2, a second control section for controlling the second semiconductor switch 11, and a computation section. There is a range of constructions and control methods for the inverter circuit 2. However, the details are not mentioned here.

The operation of the present embodiment is the same as in the first embodiment, and the first control section switches on the inverter circuit 2 by a charge start signal 16. The on time of the inverter circuit 2 is determined by; input variables such as an output voltage E of the dc power supply 1, and the charge voltage Vc, the inductance value L of the resonant inductance device 5, an initial voltage Vo, a target charge voltage V1, and a circuit loss coefficient $\alpha$ for compensating for power loss occurring in components, wiring and the like due to the flow of charging current, and when an equation $Vc=\alpha((V1^2-Vo^2)/(2E)+Vo)$ which is calculated in the computation section, is satisfied, the inverter circuit 2 is switched off. The flywheel diodes 3A through 3D of the inverter circuit 2 are switched on by the residual energy of the resonant inductance device 5 according to the conditions, and inertial current flows into the energy accumulating capacitor 8, and charging continues.

When the charge voltage Vc reaches the target charge voltage V1, the second semiconductor switch 11 is switched on to bypass excess inertial current, preventing the energy accumulating capacitor 8 from being overcharged.

When the IGBTs 4A through 4D in the inverter circuit 2, being the first semiconductor switch, are instructed to switch off, in practice there is a control delay time, charging the energy accumulating capacitor 8 to more than the target charge voltage V1. Therefore, when the energy accumulating capacitor 8 reaches the target charge voltage V1 by inertial current charging after the IGBTs 4A through 4D are switched off, the second semiconductor switch 11 is switched on to bypass the excess inertial current.

At this time, when all the IGBTs 4A through 4D in the inverter circuit 2 are switched off, the flywheel diodes 3A through 3D are switched on according to the conditions, and feed back the excess inertial current to the dc power supply 1. Therefore, it is not necessary for the excess inertial current to be consumed by a resistor or the like, enabling the inverter to operate at high frequency.

Here, there is a control delay time in the second semiconductor switch 11. However, the second semiconductor switch 11 is switched on when the inertial current is low because of the IGBTs 4A through 4D comprising the first semiconductor switch being switched off due to the above-described calculation, and thus the amount that the energy accumulating capacitor 8 is overcharged can be greatly reduced.

[Embodiment 4]

Next is a description of a fourth embodiment of a resonant charging type capacitor charging apparatus of the present invention. Since the present embodiment is an application of the principle in the second embodiment to the third embodiment, the construction of the capacitor charging apparatus is not illustrated specially. In the present embodiment, a resonant charging circuit and a circuit containing a second semiconductor switch 11 are the same as in the third embodiment. However, there is no circuit for detecting an output voltage E of a dc power supply 1. Instead a current detecting circuit using a current transformer CT is used for detecting a current I flowing through a resonant inductance device 5, and required detection values such as the current I flowing through the resonant inductance device 5, a charge voltage Vc, a target charge voltage V1, and the like, are input to the control circuit 14 as parameters.

In the case of the fourth embodiment, the on time of the first semiconductor switch 4 is determined by; input variables such as the current I flowing through the resonant inductance device 5, and the charge voltage Vc, the capacitance C of the energy accumulating capacitor 8, the inductance value L of the resonant inductance device 5, the target charge voltage V1, and a circuit loss coefficient a for compensating for power loss occurring in components, wiring and the like due to the flow of charging current, and when an equation $LI^2=\alpha C(V1^2-Vc^2)$ is satisfied, the first semiconductor switch 4 is switched off. After the first semiconductor switch 4 is switched off, the flywheel diodes 3A through 3D are switched on by the residual energy of the resonant inductance device 5 according to the conditions, inertial current flows into the energy accumulating capacitor 8, and charging continues.

The second control section switches on the second semiconductor switch 11 when the charge voltage Vc of the energy accumulating capacitor 8 reaches the target charge voltage V1. As a result, excess inertial current is bypassed through the second semiconductor switch 11, preventing the energy accumulating capacitor 8 from being overcharged, so that it is possible to charge the energy accumulating capacitor 8 with extremely high accuracy.

[Embodiment 5]

Figure 8:
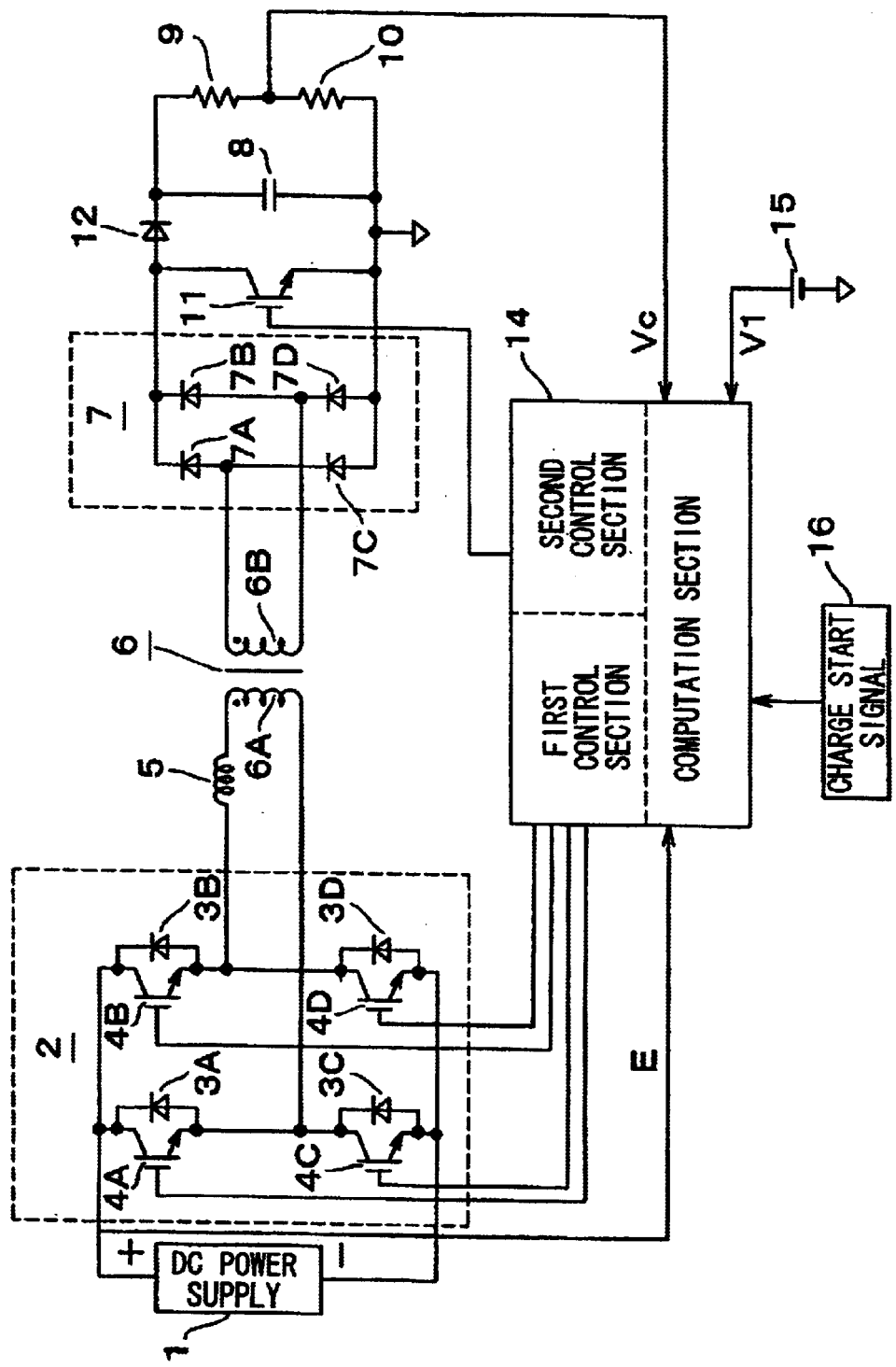
FIG. 8 is a circuit diagram showing the constitution of a capacitor charging apparatus according to a fifth embodiment of the present invention.

Next is a description of a fifth embodiment of a resonant charging type capacitor charging apparatus of the present invention with reference to FIG. 8. Differences from the third embodiment are that there are no diodes 12 and 13 connected to the secondary side of a transformer 6 for preventing reverse flow, and the connection locations of a circuit containing a second semiconductor switch 11 are different. The second semiconductor switch 11 is connected in parallel to the energy accumulating capacitor 8 via a diode 12 for preventing reverse flow. An inverter circuit 2, the on and off control operation of the second semiconductor switch 11, and its effects, are completely identical to the third embodiment.

[Embodiment 6]

Similarly to the case of the fourth embodiment, the construction of a capacitor charging apparatus according to the present embodiment is not illustrated specially. In a capacitor charging apparatus of the present embodiment, an inverter circuit 2, a resonant charging circuit, and a circuit containing a second semiconductor switch 11 are the same as in the fifth embodiment. However, there is no circuit for detecting an output voltage E of a dc power supply 1. Instead a current detecting circuit using a current transformer CT is used for detecting a current I flowing through a resonant inductance device 5, and required detection values such as the current I flowing through the resonant inductance device 5, a charge voltage Vc, a target charge voltage V1, and the like, are input to the control circuit 14 as parameters.

In the case of the sixth embodiment, the on time of the inverter circuit 2 is determined by; input variables such as the current I flowing through the resonant inductance device 5, and the charge voltage Vc, the capacitance C of the energy accumulating capacitor 8, the inductance value L of the resonant inductance device 5, the target charge voltage V1, and a circuit loss coefficient a for compensating for power loss occurring in components, wiring and the like due to the flow of charging current, and when an equation $LI^2=\alpha C(V1^2-Vc^2)$ is satisfied, the inverter circuit 2 is switched off. After the IGBTs 4A through 4D constituting the first semiconductor switch are switched off, the flywheel diodes 3A through 3D are switched on by the residual energy of the resonant inductance device 5, according to the conditions, inertial current flows into the energy accumulating capacitor 8, and charging continues.

The second control section switches on the second semiconductor switch 11 when the charge voltage Vc of the energy accumulating capacitor 8 reaches the target charge voltage V1. As a result, excess inertial current is bypassed through the second semiconductor switch 11, preventing the energy accumulating capacitor 8 from being overcharged, so that it is possible to charge the energy accumulating capacitor 8 with extremely high accuracy.

[Embodiment 7]

Figure 9:
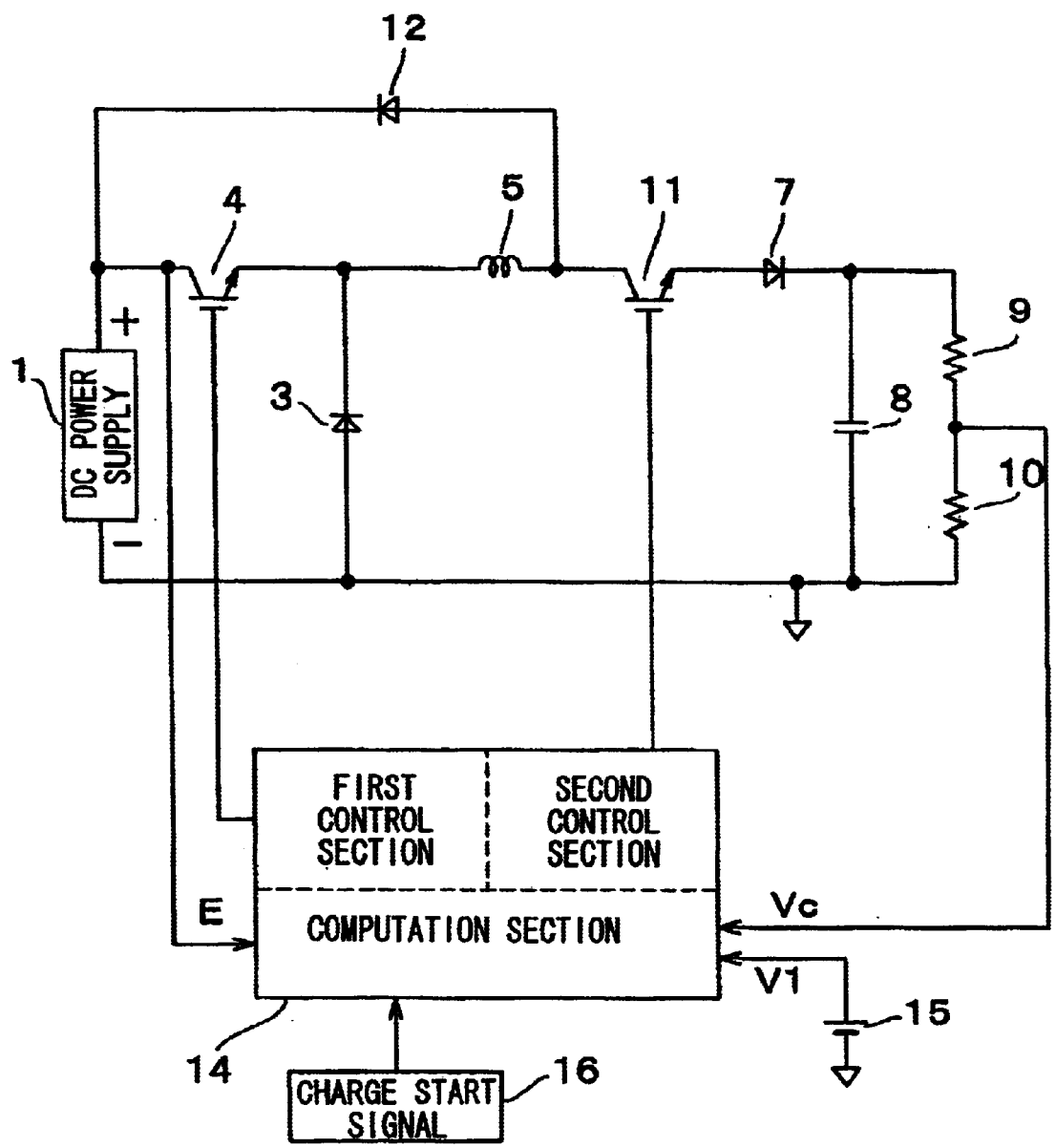
FIG. 9 is a circuit diagram showing the constitution of a capacitor charging apparatus according to a seventh embodiment of the present invention.

Next is a description of a seventh embodiment of a resonant charging type capacitor charging apparatus of the present invention with reference to FIG. 9. The seventh embodiment is an application of the principle in the first embodiment, and differences from the first embodiment are that a second semiconductor switch 11 is inserted between a resonant inductance device 5 and a diode circuit 7 for current feedback, and a diode 12 for preventing reverse flow is inserted between a node between the resonant inductance device 5 and the second semiconductor switch 11 and the positive terminal of a dc power supply 1.

A control circuit 14 comprises a first control section that controls a first semiconductor switch 4, a second control section that controls a second semiconductor switch 11, and a computation section.

Next is a description of the operation. The first semiconductor switch 4 and the second semiconductor switch 11 are switched on simultaneously by a charge start signal 16 to start charging. The on time of the first semiconductor switch 4 is determined by; input variables such as an output voltage E of the dc power supply 1, a charge voltage Vc of an energy accumulating capacitor 8, an inductance value L of the resonant inductance device 5, an initial voltage Vo, a target charge voltage V1, and a circuit loss coefficient a for compensating for power loss occurring in components, wiring or the like due to the flow of charging current, and when an equation $Vc=\alpha((V1^2-Vo^2)/(2E)+Vo)$ which is calculated in the computation section, is satisfied, the first semiconductor switch 4 is switched off.

After the first semiconductor switch 4 is switched off, the flywheel diode 3 is switched on by the residual energy of the resonant inductance device 5, inertial current flows into the energy accumulating capacitor 8 through the second semiconductor switch 11, and charging continues.

When the first semiconductor switch 4 is instructed to switch off, in practice there is a control delay time, charging the energy accumulating capacitor 8 to more than the target charge voltage V1. Therefore, when the charge voltage Vc of the energy accumulating capacitor 8 reaches the target charge voltage V1 by inertial current charging after the first semiconductor switch 4 is switched off, the second semiconductor switch 11 is switched off to cut off excess inertial current, and the excess inertial current is fed back to the dc power supply 1. As a result, the energy accumulating capacitor 8 is not overcharged.

Furthermore, since the excess inertial current is fed back to the dc power supply 1, it is not necessary for the excess inertial current to be consumed by a resistor or the like, enabling the first semiconductor switch 4 to operate at high frequency.

Here, there is a control delay time in the second semiconductor switch 11. However, the second semiconductor switch 11 is switched off when the inertial current is low because of the first semiconductor switch 4 being off due to the above-described calculation, and thus the amount that the energy accumulating capacitor 8 is overcharged can be reduced, enabling extremely highly accurate charging.

[Embodiment 8]

Figure 10:
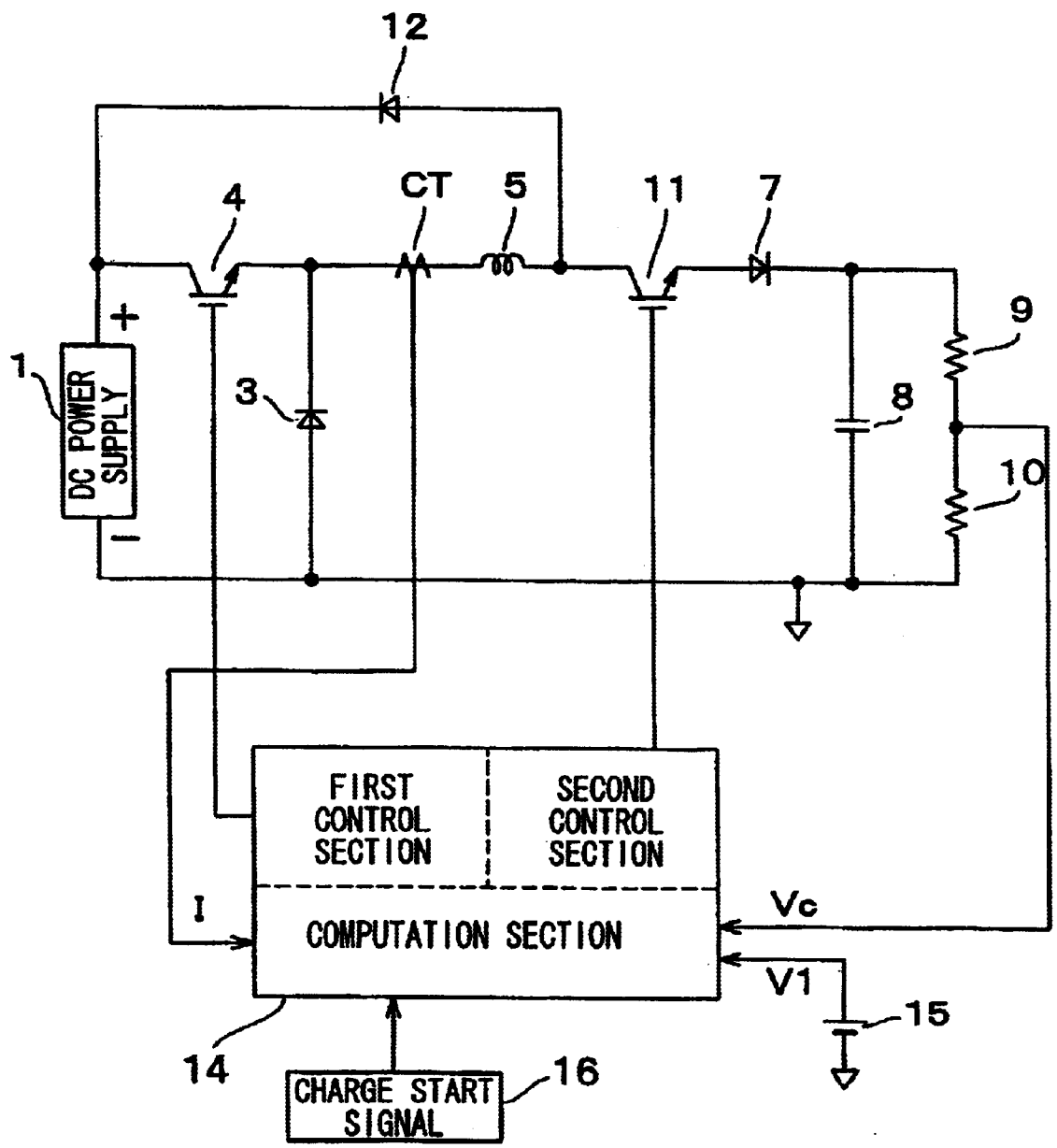
FIG. 10 is a circuit diagram showing the constitution of a capacitor charging apparatus according to an eighth embodiment of the present invention.

Next is a description of an eighth embodiment of a resonant charging type capacitor charging apparatus of the present invention with reference to FIG. 10. This eighth embodiment is an application of the principle of the second embodiment, and a resonant charging circuit and a circuit containing a second semiconductor switch 11 are the same as in the seventh embodiment. However, differences from the seventh embodiment are that there is no circuit for detecting an output voltage E of a dc power supply 1, and instead there is a current detecting circuit using a current transformer CT for detecting a current I flowing into a resonant inductance device 5. A control circuit 14 comprises a first control section that controls a first semiconductor switch 4, a second control section that controls a second semiconductor switch 11, and a computation section, similarly to the seventh embodiment.

Required detection values such as the current I flowing through the resonant inductance device 5, a charge voltage Vc of an energy accumulating capacitor 8, a target charge voltage V1, and the like, are input to the control circuit 14 as parameters. The operation of the resonant charging circuit and the operation of the control circuit are the same as in the seventh embodiment, and hence the descriptions are omitted.

A charge start signal 16 switches on the first semiconductor switch 4 and the second semiconductor switch 11 simultaneously to start charging. The on time of the first semiconductor switch 4 is determined by; input variables such as the current I flowing through the resonant inductance device 5, a charge voltage Vc, a capacitance C of the energy accumulating capacitor 8, an inductance value L of the resonant inductance device 5, the target charge voltage V1, and a circuit loss coefficient a for compensating for power loss occurring in components, wiring and the like due to the flow of charging current, and when an equation $LI^2=\alpha C(V1^2-Vc^2)$ is satisfied, the first semiconductor switch 4 is switched off.

After the first semiconductor switch is switched off, the flywheel diode 3 is switched on by the residual energy of the resonant inductance device 5, inertial current flows into the energy accumulating capacitor 8 through the second semiconductor switch 11, and charging continues.

When the first semiconductor switch 4 is instructed to switch off, in practice there is a control delay time, charging the energy accumulating capacitor 8 to more than the target charge voltage V1. Therefore, when the charge voltage Vc of the energy accumulating capacitor 8 reaches the target charge voltage V1 by inertial current charging after the first semiconductor switch 4 is switched off, the second semiconductor switch 11 is switched off to cut off excess inertial current, and the excess inertial current is fed back to the dc power supply 1. As a result, the energy accumulating capacitor 8 is not overcharged.

Furthermore, since the excess inertial current is fed back to the dc power supply 1, it is not necessary for the excess inertial current to be consumed by a resistor or the like, enabling the first semiconductor switch 4 to operate at high frequency.

Here, there is a control delay time in the second semiconductor switch 11. However, the second semiconductor switch 11 is switched off when the inertial current is low because of the first semiconductor switch 4 being switched off due to the above-described calculation, and thus the amount that the energy accumulating capacitor 8 is overcharged can be reduced, enabling extremely highly accurate charging.

[Embodiment 9]

Figure 11:
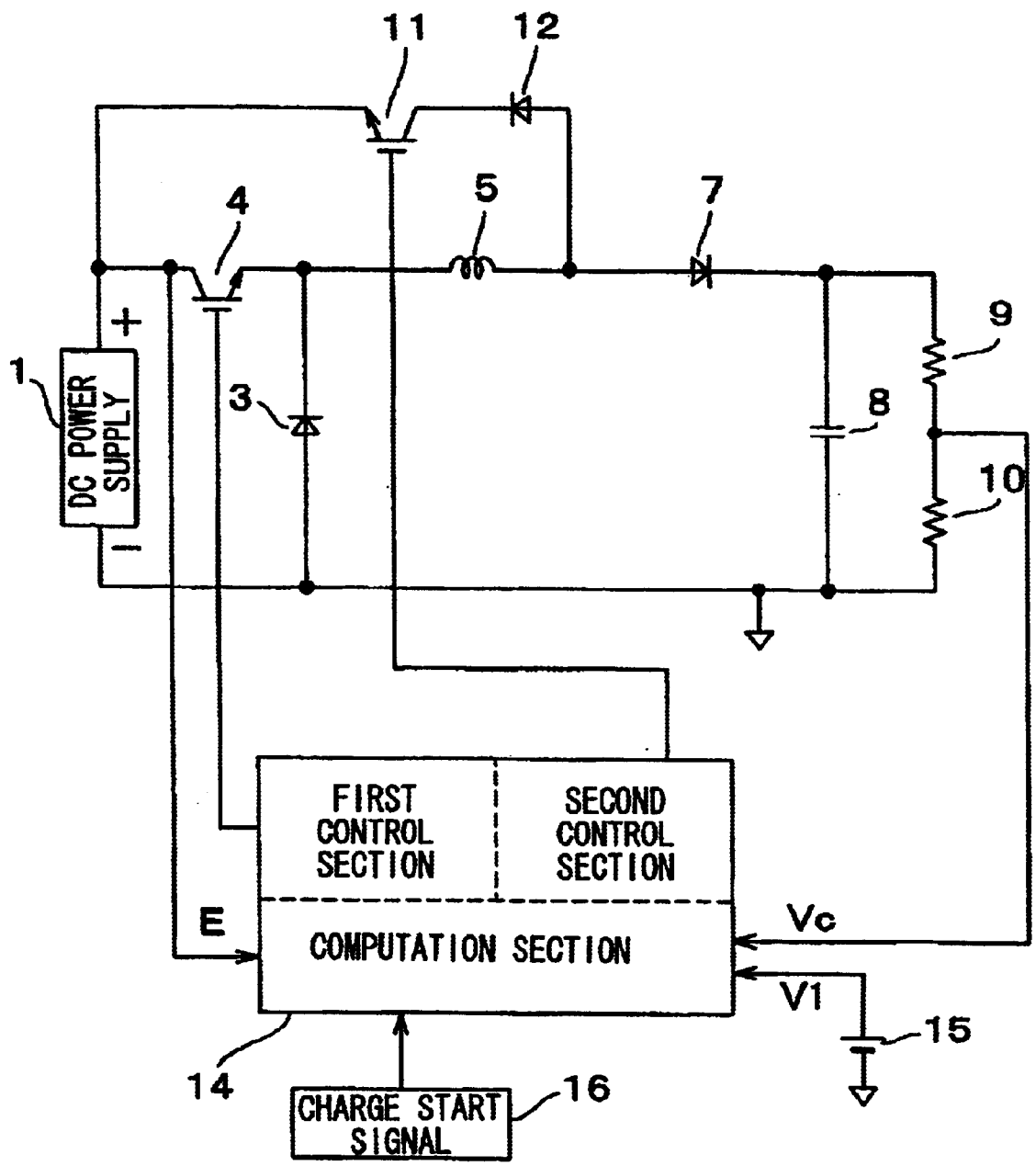
FIG. 11 is a circuit diagram showing the constitution of a capacitor charging apparatus according to a ninth embodiment of the present invention.

Next is a description of a ninth embodiment of a resonant charging type capacitor charging apparatus of the present invention with reference to FIG. 11. This embodiment is an application of the principle of the first embodiment, and a difference from the seventh embodiment is the connection location of a second semiconductor switch 11. That is, the second semiconductor switch 11 is inserted between a node between a resonant inductance device 5 and a diode 12 for preventing reverse flow, and the positive terminal of a dc power supply 1.

Next is a description of the operation. A first semiconductor switch 4 is switched on by a charge start signal 16, and the second semiconductor switch 11 is switched off simultaneously to start charging. The on time of the first semiconductor switch 4 is determined by; input variables such as an output voltage E of a dc power supply 1, and a charge voltage Vc of an energy accumulating capacitor 8, an inductance value L of the resonant inductance device 5, an initial voltage Vo, a target charge voltage V1, and a circuit loss coefficient a for compensating for power loss occurring in components, wiring or the like due to the flow of charging current, and when an equation $Vc=\alpha((V1^2-Vo^2)/(2E)+Vo)$ which is calculated in the computation section, is satisfied, the first semiconductor switch 4 is switched off.

After the first semiconductor switch 4 is switched off, the flywheel diode 3 is switched on by the residual energy of the resonant inductance device 5, inertial current flows into the energy accumulating capacitor 8, and charging continues.

When the first semiconductor switch 4 is instructed to switch off, in practice there is a control delay time, charging the energy accumulating capacitor 8 to more than the target charge voltage V1. Therefore, when the charge voltage Vc of the energy accumulating capacitor 8 reaches the target charge voltage V1 by inertial current charging after the first semiconductor switch 4 is switched off, the second semiconductor switch 11 is switched on to cut off excess inertial current, and the excess inertial current is fed back to the dc power supply 1. As a result, the energy accumulating capacitor 8 is not overcharged.

Furthermore, since the excess inertial current is fed back to the dc power supply 1, it is not necessary for the excess inertial current to be consumed by a resistor or the like, enabling the first semiconductor switch 4 to operate at high frequency.

Here, there is a control delay time in the second semiconductor switch 11. However, the second semiconductor switch 11 is switched off when the inertial current is low because of the first semiconductor switch 4 being off due to the above-described calculation, and thus the amount that the energy accumulating capacitor 8 is overcharged can be reduced, enabling extremely highly accurate charging.

[Embodiment 10]

Similarly to the case of the fourth embodiment, the construction of a capacitor charging apparatus according to the present embodiment is not illustrated specially. In a capacitor charging apparatus of the present embodiment, a first semiconductor switch 4, a resonant charging circuit, and a circuit containing a second semiconductor switch 11 are the same as in the ninth embodiment. However, there is no circuit for detecting an output voltage E of a dc power supply 1. Instead, a current detecting circuit using a current transformer CT is used for detecting a current I flowing through a resonant inductance device 5, and required detection values such as the current I flowing through the resonant inductance device 5, a charge voltage Vc, a target charge voltage V1, and the like, are input to the control circuit 14 as parameters.

In the case of the tenth embodiment, the on time of the first semiconductor switch 4 is determined by; input variables such as the current I flowing through the resonant inductance device 5, and the charge voltage Vc, a capacitance C of an energy accumulating capacitor 8, an inductance value L of the resonant inductance device 5, the target charge voltage V1, and a circuit loss coefficient α for compensating for power loss occurring in components, wiring and the like due to the flow of charging current, and when an equation $LI^2=\alpha C(V1^2-Vc^2)$ is satisfied, the first semiconductor switch 4 is switched off. After the first semiconductor switch 4 is switched off, the flywheel diode 3 is switched on by the residual energy of the resonant inductance device 5, inertial current flows into the energy accumulating capacitor 8, and charging continues.

When the charge voltage Vc reaches the target charge voltage V1, the second control section turns on the second semiconductor switch 11 to cut off excess inertial current, and feeds back the excess inertial current to the dc power supply 1, so that the energy accumulating capacitor 8 is not overcharged. As a result, it is possible to charge the energy accumulating capacitor 8 with extremely high accuracy.

[Embodiment 11]

Next as an eleventh embodiment, is a description of a technical idea outside of what can be understood from the above-described embodiments, together with its effect.

In FIG. 11, a plurality of dc power supplies connected in series are used for a dc power supply 1, and a second semiconductor switch 4 is connected to a node between the plurality of dc power supplies.

In this case, even when a target charge voltage V1 of an energy accumulating capacitor is less than an output voltage E of the dc power supply 1, by switching on the second semiconductor switch 11 when the first semiconductor switch 4 is switched off, the excess inertial current can be fed back to the dc power supply 1, preventing an energy accumulating capacitor 8 from being overcharged.

In the above-described first embodiment through eleventh embodiment, calculation and control are performed in analog circuits. However, AD (analog/digital) converters may be installed as a signal detection circuit, and analog detection values converted into digital signals, so that digital calculation and control can be performed using a microprocessor or the like.

The above first embodiment through eleventh embodiment are described using IGBTs as semiconductor switching elements. However, another element such as an FET (field effect transistor), a transistor or the like can be used. When an FET is used, the body diode of this FET can be used as a flywheel diode.

Furthermore, in the equations described above, a current I flowing through a resonant inductance device must be divided by the turn ratio of a transformer. In this case, needless to say an inductance value L must be multiplied by the square of the turn ratio of a transformer.

Moreover, the diode circuit 7 may be constructed using a half-wave bridge rectifier.

What is claimed is:

1. A capacitor charging method comprising the steps of:
in a series connected circuit of a first semiconductor switch, a resonant inductance device, a diode circuit, and an energy accumulating capacitor, which are connected together in series to a dc power supply, starting charging of the energy accumulating capacitor due to the resonance of the resonant inductance device and the energy accumulating capacitor by switching on the first semiconductor switch;

stopping energy supply from the dc power supply to the resonant inductance device by switching off the first semiconductor switch, when an equation $Vc=\alpha((V1^2-Vo^2)/(2E)+Vo)$ is satisfied, where V1 is a target charge voltage of the energy accumulating capacitor, Vc is a charge voltage of the energy accumulating capacitor, Vo is an initial voltage of the energy accumulating capacitor, E is an output voltage of the dc power supply, and a is a circuit loss coefficient for compensating for power loss occurring in components and wiring due to the flow of charging current; and after the first semiconductor switch is switched off, charging the energy accumulating capacitor to the target charge voltage V1 by the flow of inertial current caused by magnetic energy stored in the resonant inductance device, using a flywheel diode.

2. A capacitor charging method according to claim 1, wherein when the voltage of the energy accumulating capacitor reaches the target charge voltage V1 by means of the inertial current, bypassing the inertial current flowing into the energy accumulating capacitor by switching on a second semiconductor switch.

3. A capacitor charging method according to claim 1, wherein when the voltage of the energy accumulating capacitor reaches the target charge voltage V1 by means of the inertial current, switching on or off a second semiconductor switch that cuts off the inertial current flowing into the energy accumulating capacitor and feeding back the inertial current to the dc power supply.

4. A capacitor charging method comprising the steps of:
in a series connected circuit of a first semiconductor switch, a resonant inductance device, a diode circuit, and an energy accumulating capacitor, which are connected together in series to a dc power supply, starting charging of the energy accumulating capacitor due to the resonance of the resonant inductance device and the energy accumulating capacitor by switching on the first semiconductor switch;

stopping energy supply from the dc power supply to the resonant inductance device by switching off the first semiconductor switch, when an equation $LI^2=\alpha C(V1^2-Vc^2)$ is satisfied, where I is a current flowing through the resonance inductance device, C is a capacitance of the energy accumulating capacitor, L is an inductance value of the resonant inductance device, V1 is a target charge voltage of the energy accumulating capacitor, Vc is a charge voltage of the energy accumulating capacitor, and a is a circuit loss coefficient for compensating for power loss occurring in components and wiring due to the flow of charging current; and after the first semiconductor switch is switched off, charging the energy accumulating capacitor to the target charge voltage V1 by the flow of inertial current caused by magnetic energy stored in the resonant inductance device, using a flywheel diode.

5. A capacitor charging method according to claim 4, wherein when the voltage of the energy accumulating capacitor reaches the target charge voltage V1 by means of the inertial current, bypassing the inertial current flowing into the energy accumulating capacitor by switching on a second semiconductor switch.

6. A capacitor charging method according to claim 4, wherein when the voltage of the energy accumulating capacitor reaches the target charge voltage V1 by means of the inertial current, switching on or off a second semiconductor switch that cuts off the inertial current flowing into the energy accumulating capacitor and feeding back the inertial current to the dc power supply.

7. A capacitor charging apparatus, comprising:
a first semiconductor switch, a resonant inductance device, a diode circuit, and an energy accumulating capacitor, which are connected together in series to a dc power supply;
a first detecting device which detects an output voltage E of the dc power supply;
a second detecting device which detects a charge voltage Vc of the energy accumulating capacitor;
a computation section which outputs a signal for switching off the first semiconductor switch when an equation $Vc=\alpha((V1^2-Vo^2)/(2E)+Vo)$ is satisfied, using values detected by the first detecting device and the second detecting device, where V1 is a target charge voltage of the energy accumulating capacitor, Vo is an initial voltage of the energy accumulating capacitor, and $\alpha$ is a circuit loss coefficient for compensating for power loss occurring in components and wiring due to the flow of charging current;
a first control section which charges the energy accumulating capacitor due to the resonance of the resonant inductance device and the energy accumulating capacitor by switching on the first semiconductor switch, and stops energy supply from the dc power supply to the resonant inductance device by switching off the first semiconductor switch, according to the signal from the computation section; and
a flywheel diode which charges the energy accumulating capacitor to the target charge voltage V1 by means of the flow of inertial current caused by magnetic energy stored in the resonant inductance device after the first semiconductor switch is switched off.

8. A capacitor charging apparatus according to claim 7, further comprising:
a second semiconductor switch which bypasses the inertial current to the energy accumulating capacitor; and
a second control section which switches on the second semiconductor switch when the charge voltage of the energy accumulating capacitor reaches the target charge voltage V1 by means of the inertial current, using values detected by the first detecting device and the second detecting device, or the current detecting device and the voltage detecting device.

9. A capacitor charging apparatus according to claim 8, wherein there is further provided a step-up transformer disposed between the resonant inductance device and the second semiconductor switch, and
the resonant inductance device includes leakage inductance of the transformer.

10. A capacitor charging apparatus according to claim 8, wherein the second semiconductor switch is connected in parallel to both terminals of the energy accumulating capacitor, and the diode circuit is connected between the second semiconductor switch and the energy accumulating capacitor.

11. A capacitor charging apparatus according to claim 7, wherein the diode circuit is a full bridge circuit, a half bridge circuit or a diode.

12. A capacitor charging apparatus according to claim 7, comprising:
a second semiconductor switch which cuts off the inertial current to the energy accumulating capacitor; and
a second control section which switches on or off the second semiconductor switch when the charge voltage of the energy accumulating capacitor reaches the target charge voltage V1 by means of the inertial current, using values detected by the first detecting device and the second detecting device, or the current detecting device and the voltage detecting device, and feeds back the inertial current to the dc power supply.

13. A capacitor charging apparatus according to claim 12, wherein one end of the second semiconductor switch is connected to a node between the resonant inductance device and a diode for preventing reverse flow, via the diode for preventing reverse flow, and the other end is connected to the dc power supply.

14. A capacitor charging apparatus according to claim 12, wherein one end of the second semiconductor switch is connected to a node between the resonant inductance device and the diode circuit via a diode for preventing reverse flow, and the other end is connected to the dc power supply.

15. A capacitor charging apparatus according to claim 7, wherein the first semiconductor switch is a bridge inverter circuit, which is provided with four semiconductor switches in two pairs, and flywheel diodes connected in reverse parallel to these semiconductor switches respectively.

16. A capacitor charging apparatus, comprising:
a first semiconductor switch, a resonant inductance device, a diode circuit, and an energy accumulating capacitor, which are connected in series to a dc power supply;
a current detecting device which detects a current I flowing through the resonant inductance device;
a voltage detecting device which detects a charge voltage Vc of the energy accumulating capacitor;
a computation section which outputs a signal for switching off the first semiconductor switch when an equation $LI^2=\alpha C(V1^2-Vc^2)$ is satisfied, using values detected by the current detecting device and the voltage detecting device, where C is a capacitance of the energy accumulating capacitor, L is an inductance value of the resonant inductance device, V1 is a target charge voltage of the energy accumulating capacitor, and $\alpha$ is a circuit loss coefficient for compensating for power loss occurring in components and wiring due to the flow of charging current;
a first control section which charges the energy accumulating capacitor due to the resonance of the resonant inductance device and the energy accumulating capacitor by switching on the first semiconductor switch, and stops energy supply from the dc power supply to the resonant inductance device by switching off the first semiconductor switch, according to the signal from the computation section; and
a flywheel diode which charges the energy accumulating capacitor to the target charge voltage V1 by means of the flow of inertial current caused by magnetic energy stored in the resonant inductance device after the first semiconductor switch is switched off.

17. A capacitor charging apparatus according to claim 16, further comprising:

a second semiconductor switch which bypasses the inertial current to the energy accumulating capacitor; and a second control section which switches on the second semiconductor switch when the charge voltage of the energy accumulating capacitor reaches the target charge voltage V1 by means of the inertial current, using values detected by the first detecting device and the second detecting device, or the current detecting device and the voltage detecting device.

18. A capacitor charging apparatus according to claim 16, wherein the first semiconductor switch is a bridge inverter circuit, which is provided with four semiconductor switches in two pairs, and flywheel diodes connected in reverse parallel to these semiconductor switches respectively.

19. A capacitor charging apparatus according to claim 16, wherein the diode circuit is a full bridge circuit, a half bridge circuit or a diode.

20. A capacitor charging apparatus according to claim 16, further comprising:

a second semiconductor switch which cuts off the inertial current to the energy accumulating capacitor; and a second control section which switches on or off the second semiconductor switch when the charge voltage of the energy accumulating capacitor reaches the target charge voltage V1 by means of the inertial current, using values detected by the first detecting device and the second detecting device, or the current detecting device and the voltage detecting device, and feeds back the inertial current to the dc power supply.

* * * * *

UNITED STATES PATENT AND TRADEMARK OFFICE
CERTIFICATE OF CORRECTION

PATENT NO.     : 6,737,847 B2
DATED          : May 18, 2004
INVENTOR(S)    : Watanabe et al.

It is certified that error appears in the above-identified patent and that said Letters Patent is hereby corrected as shown below:

Column 3,
Line 35, "from the de power supply", should read -- from the dc power supply --;

Column 4,
Line 33, "to an de power supply", should read -- to an dc power supply --;

Column 5,
Line 50, "connected to the de", should read -- connected to the dc --;

Column 8,
Line 42, "from the de power supply 1", should read -- from the dc power supply 1 --;

Column 9,
Line 2, "circuit loss coefficient a is taken", should read -- circuit loss coefficient $\alpha$ is taken --;
Line 36, "semiconductor switch 111", should read -- semiconductor switch 11 --;
Line 61, "loss coefficient a for compensating", should read -- loss coefficient $\alpha$ for compensating --;

Column 10,
Line 50, "correction coefficient a for compensating", should read -- correction coefficient $\alpha$ for compensating --;

Column 13,
Line 16, "circuit loss coefficient a for", should read -- circuit loss coefficient $\alpha$ for --;

Column 14,
Lines 2 and 44, "circuit loss coefficient a for", should read -- circuit loss coefficient $\alpha$ for --;

Column 15,
Line 42, "circuit loss coefficient a for", should read -- circuit loss coefficient $\alpha$ for --;

Column 16,
Line 29, "loss coefficient a for compensating", should read -- loss coefficient $\alpha$ for compensating --;

UNITED STATES PATENT AND TRADEMARK OFFICE
CERTIFICATE OF CORRECTION

PATENT NO. : 6,737,847 B2
DATED : May 18, 2004
INVENTOR(S) : Watanabe et al.

It is certified that error appears in the above-identified patent and that said Letters Patent is hereby corrected as shown below:

<u>Column 18,</u>
Lines 19 and 58, "and a is a circuit loss coefficient", should read -- and $\alpha$ is a circuit loss coefficient --.

Signed and Sealed this

Ninth Day of May, 2006

JON W. DUDAS
*Director of the United States Patent and Trademark Office*